(12) United States Patent
Kim et al.

(10) Patent No.: US 10,534,463 B2
(45) Date of Patent: Jan. 14, 2020

(54) TOUCH INPUT DEVICE

(71) Applicant: HiDeep Inc., Gyeonggi-do (KR)

(72) Inventors: Seyeob Kim, Gyeonggi-do (KR);
Bonkee Kim, Gyeonggi-do (KR)

(73) Assignee: HIDEEP INC. (KR)

( * ) Notice: Subject to any disclaimer, the term of this patent is extended or adjusted under 35 U.S.C. 154(b) by 117 days.

(21) Appl. No.: 15/707,455

(22) Filed: Sep. 18, 2017

(65) Prior Publication Data

US 2018/0143718 A1  May 24, 2018

(30) Foreign Application Priority Data

Nov. 24, 2016  (KR) .................. 10-2016-0157284

(51) Int. Cl.
*G06F 3/041* (2006.01)
*G06F 3/044* (2006.01)
*G01L 1/14* (2006.01)
*G02F 1/1333* (2006.01)

(52) U.S. Cl.
CPC ............ *G06F 3/0412* (2013.01); *G01L 1/146* (2013.01); *G06F 3/044* (2013.01); *G06F 3/0414* (2013.01); *G02F 2001/133331* (2013.01); *G06F 2203/04112* (2013.01)

(58) Field of Classification Search
CPC ...... G06F 3/0412; G06F 3/0414; G06F 3/044; G06F 2203/04112; G01L 1/146; G02F 2001/133331
USPC ....................................................... 345/173
See application file for complete search history.

(56) References Cited

U.S. PATENT DOCUMENTS

| | | | |
|---|---|---|---|
| 2013/0234734 A1* | 9/2013 | Iida .................. | G06F 3/044 324/661 |
| 2016/0034087 A1 | 2/2016 | Kim et al. | |
| 2016/0216729 A1* | 7/2016 | Ohtomo .............. | G06F 1/1601 |
| 2016/0299598 A1 | 10/2016 | Yoon et al. | |
| 2017/0135197 A1* | 5/2017 | Huitema ............ | H05K 1/0393 |
| 2017/0269758 A1* | 9/2017 | Wen .................. | G06F 3/0414 |

OTHER PUBLICATIONS

EPO Search Report dated Apr. 16, 2018 for corresponding application EP 17191706.5.

* cited by examiner

*Primary Examiner* — Jennifer Mehmood
*Assistant Examiner* — Ngan T Pham Lu
(74) *Attorney, Agent, or Firm* — The Belles Group, P.C.

(57) ABSTRACT

A touch input device may be provided that includes: a cover; a display module disposed under the cover; and a pressure sensing unit disposed under the display module. The pressure sensing unit includes a first elastic foam, a pressure sensor disposed on the first elastic foam, and a first adhesive layer disposed between the first elastic foam and the pressure sensor. A change amount of a stress of the first elastic foam required for the first elastic foam to be compressed to half of the thickness thereof from its original state is less than the change amount of the stress of the first elastic foam required for the first elastic foam to be compressed from half of the thickness thereof to the thickness to which the first elastic foam is able to be maximally compressed.

18 Claims, 32 Drawing Sheets

TOUCH INPUT DEVICE

CROSS REFERENCE TO RELATED APPLICATIONS

Priority is claimed under 35 U.S.C. § 119 to Korean Patent Application No. 10-2016-0157284, filed Nov. 24, 2016, the disclosure of which is incorporated herein by reference in its entirety.

BACKGROUND

Field

The present disclosure relates to a touch input device and more particularly to a pressure sensor which is applied to a touch input device configured to detect a touch position and detects a touch pressure, and the touch input device including the pressure sensor.

Description of the Related Art

Various kinds of input devices are being used to operate a computing system. For example, the input device includes a button, key, joystick and touch screen. Since the touch screen is easy and simple to operate, the touch screen is increasingly being used in operation of the computing system.

The touch screen may constitute a touch surface of a touch input device including a touch sensor panel which may be a transparent panel including a touch-sensitive surface. The touch sensor panel is attached to the front side of a display screen, and then the touch-sensitive surface may cover the visible side of the display screen. The touch screen allows a user to operate the computing system by simply touching the touch screen by a finger, etc. Generally, the computing system recognizes the touch and a position of the touch on the touch screen and analyzes the touch, and thus, performs the operations in accordance with the analysis.

Here, there is a demand for a touch input device capable of detecting not only the touch position according to the touch on the touch screen but a pressure magnitude of the touch.

BRIEF SUMMARY

One embodiment is a touch input device that includes: a cover; a display module disposed under the cover; and a pressure sensing unit disposed under the display module. The pressure sensing unit includes a first elastic foam, a pressure sensor disposed on the first elastic foam, and a first adhesive layer disposed between the first elastic foam and the pressure sensor. A change amount of a stress of the first elastic foam required for the first elastic foam to be compressed to half of the thickness thereof from its original state is less than the change amount of the stress of the first elastic foam required for the first elastic foam to be compressed from half of the thickness thereof to the thickness to which the first elastic foam is able to be maximally compressed.

BRIEF DESCRIPTION OF THE DRAWINGS

The present disclosure will become more fully understood from the detailed description and the accompanying drawings, wherein.

DETAILED DESCRIPTION

Figure 1A:
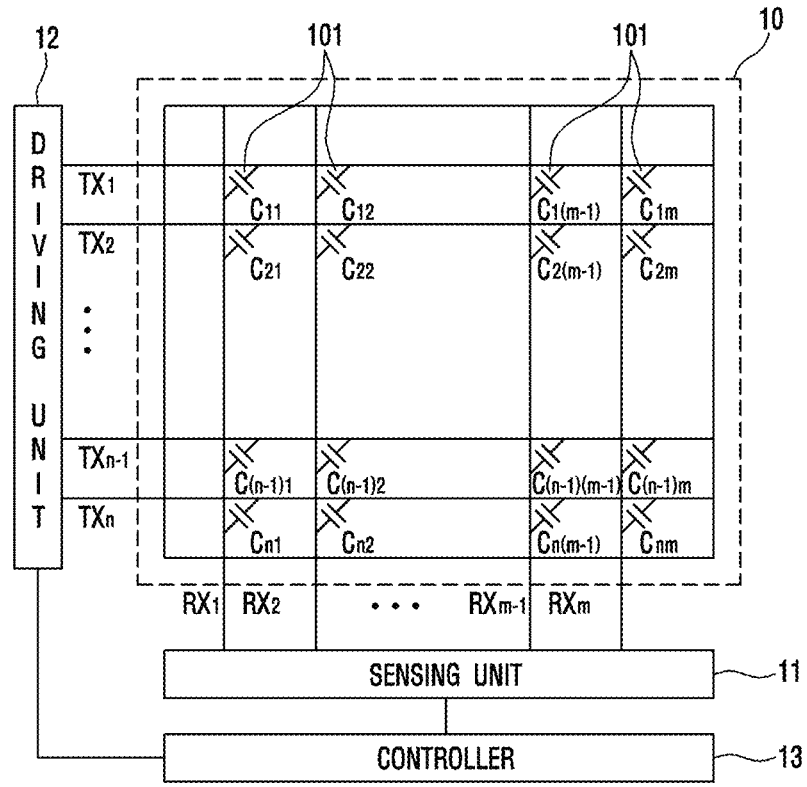
FIGS. 1a and 1b are schematic views showing a capacitance type touch sensor included in a touch input device according to an embodiment of the present invention and a configuration for operations of the same.

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit and scope of the present invention. Similar reference numerals in the drawings designate the same or similar functions in many aspects.

Hereafter, a touch input device capable of detecting a pressure in accordance with the embodiment of the present invention will be described with reference to the accompanying drawings. While a capacitance type touch sensor 10 is described below, the touch sensor 10 capable of detecting a touch position in any manner may be applied.

FIG. 1a is schematic views of a configuration of the capacitance type touch sensor 10 included in the touch input device according to the embodiment of the present invention and the operation of the capacitance type touch sensor. Referring to FIG. 1a, the touch sensor 10 may include a plurality of drive electrodes TX1 to TXn and a plurality of receiving electrodes RX1 to RXm, and may include a driving unit 12 which applies a drive signal to the plurality of the drive electrodes TX1 to TXn for the purpose of the operation of the touch sensor 10, and a sensing unit 11 which detects the touch and the touch position by receiving from the plurality of the receiving electrodes RX1 to RXm a sensing signal including information on a capacitance change amount changing according to the touch on a touch surface.

As shown in FIG. 1a, the touch sensor 10 may include the plurality of drive electrodes TX1 to TXn and the plurality of receiving electrodes RX1 to RXm. While FIG. 1a shows that the plurality of drive electrodes TX1 to TXn and the plurality of receiving electrodes RX1 to RXm of the touch sensor 10 form an orthogonal array, the present invention is not limited to this. The plurality of drive electrodes TX1 to TXn and the plurality of receiving electrodes RX1 to RXm has an array of arbitrary dimension, for example, a diagonal array, a concentric array, a 3-dimensional random array, etc., and an array obtained by the application of them. Here, "n" and "m" are positive integers and may be the same as each other or may have different values. The magnitude of the value may be changed depending on the embodiment.

The plurality of drive electrodes TX1 to TXn and the plurality of receiving electrodes RX1 to RXm may be arranged to cross each other. The drive electrode TX may include the plurality of drive electrodes TX1 to TXn extending in a first axial direction. The receiving electrode RX may include the plurality of receiving electrodes RX1 to RXm extending in a second axial direction crossing the first axial direction.

Figure 14A:
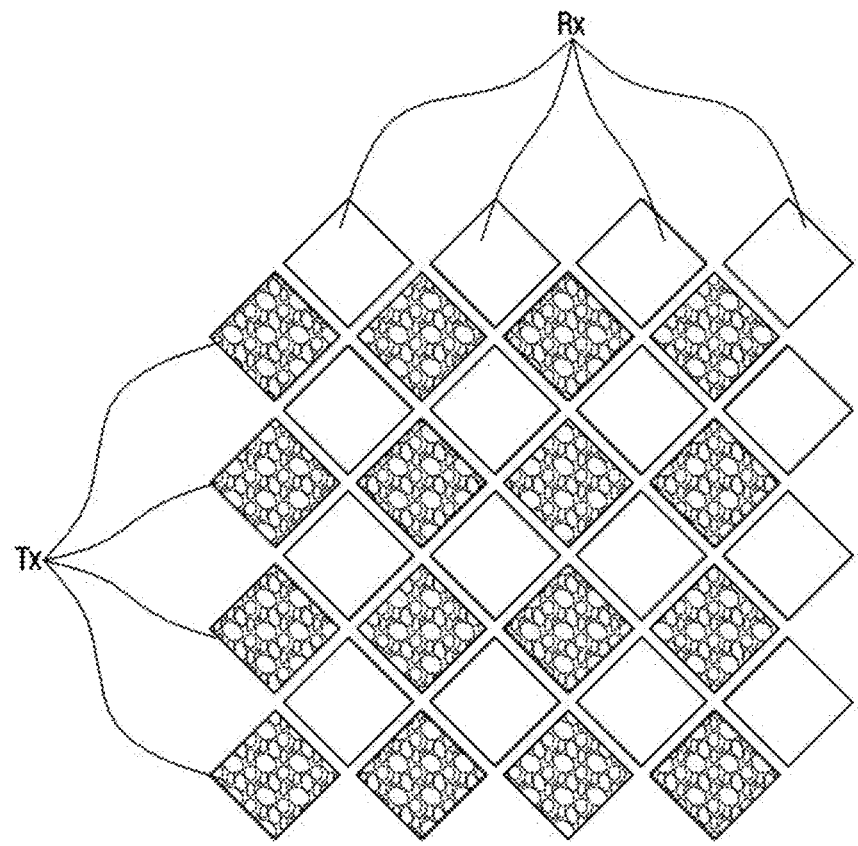
FIGS. 14a to 14d are views showing a form of an electrode included in the touch input device according to the embodiment of the present invention.
Figure 14B:
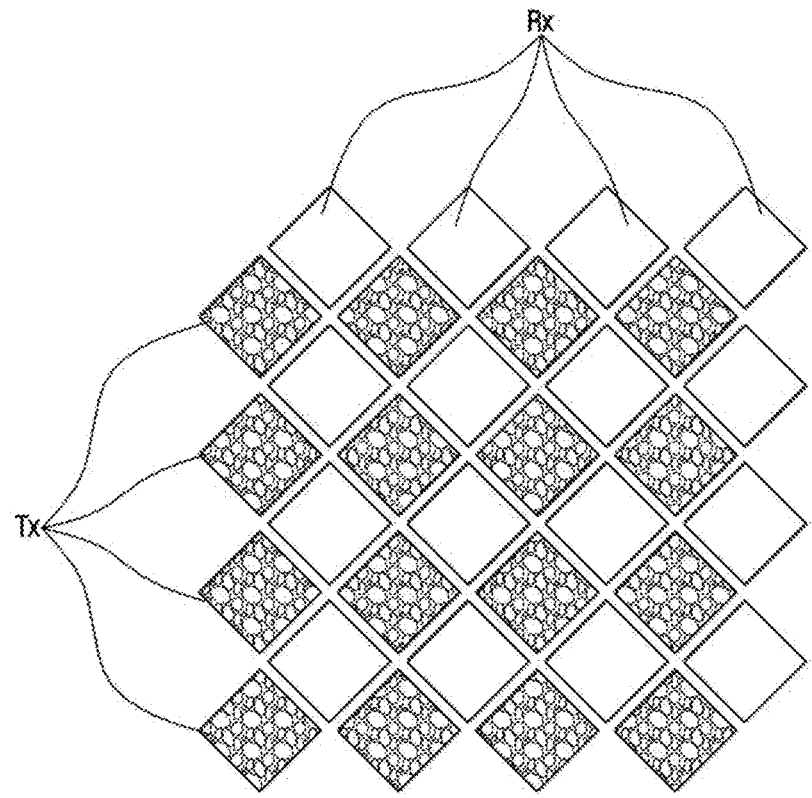

As shown in FIGS. 14a and 14b, in the touch sensor 10 according to the embodiment of the present invention, the plurality of drive electrodes TX1 to TXn and the plurality of receiving electrodes RX1 to RXm may be formed in the same layer. For example, the plurality of drive electrodes TX1 to TXn and the plurality of receiving electrodes RX1 to RXm may be formed on a top surface of a display panel 200A to be described later.

Figure 14C:
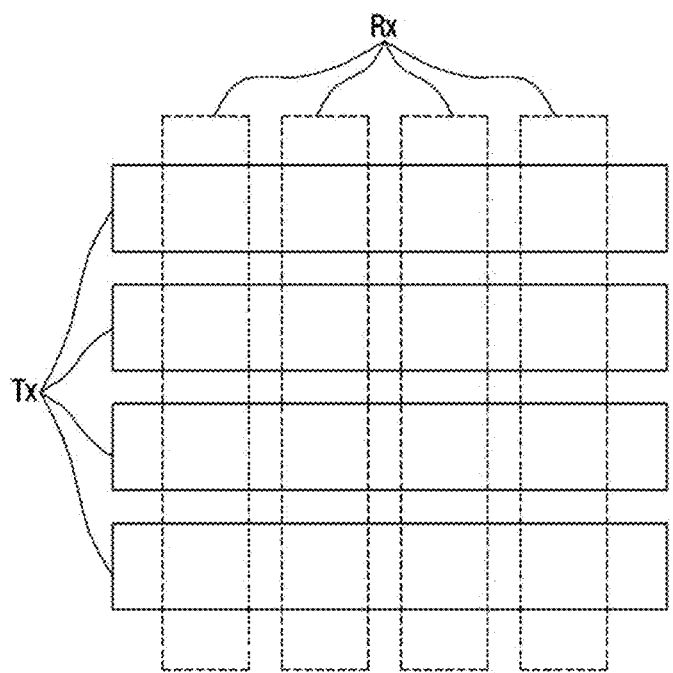

Also, as shown in FIG. 14c, the plurality of drive electrodes TX1 to TXn and the plurality of receiving electrodes RX1 to RXm may be formed in different layers. For example, any one of the plurality of drive electrodes TX1 to TXn and the plurality of receiving electrodes RX1 to RXm may be formed on the top surface of the display panel 200A, and the other may be formed on a bottom surface of a cover to be described later or may be formed within the display panel 200A.

The plurality of drive electrodes TX1 to TXn and the plurality of receiving electrodes RX1 to RXm may be made of a transparent conductive material (for example, indium tin oxide (ITO) or antimony tin oxide (ATO) which is made of tin oxide ($SnO_2$), and indium oxide ($In_2O_3$), etc.), or the like. However, this is only an example. The drive electrode TX and the receiving electrode RX may be also made of another transparent conductive material or an opaque conductive material. For instance, the drive electrode TX and the receiving electrode RX may include at least any one of silver ink, copper, and carbon nanotube (CNT). Also, the drive electrode TX and the receiving electrode RX may be made of metal mesh.

The driving unit 12 according to the embodiment of the present invention may apply a drive signal to the drive electrodes TX1 to TXn. In the embodiment of the present invention, one drive signal may be sequentially applied at a time to the first drive electrode TX1 to the n-th drive electrode TXn. The drive signal may be applied again repeatedly. This is only an example. The drive signal may be applied to the plurality of drive electrodes at the same time in accordance with the embodiment.

Through the receiving electrodes RX1 to RXm, the sensing unit 11 receives the sensing signal including information on a capacitance (Cm) 14 generated between the receiving electrodes RX1 to RXm and the drive electrodes TX1 to TXn to which the driving signal has been applied, thereby detecting whether or not the touch has occurred and where the touch has occurred. For example, the sensing signal may be a signal coupled by the capacitance (Cm) 14 generated between the receiving electrode RX and the drive electrode TX to which the driving signal has been applied. As such, the process of sensing the driving signal applied from the first drive electrode TX1 to the n-th drive electrode TXn through the receiving electrodes RX1 to RXm can be referred to as a process of scanning the touch sensor 10.

For example, the sensing unit 11 may include a receiver (not shown) which is connected to each of the receiving electrodes RX1 to RXm through a switch. The switch becomes the on-state in a time interval during which the signal of the corresponding receiving electrode RX is sensed, thereby allowing the receiver to sense the sensing signal from the receiving electrode RX. The receiver may include an amplifier (not shown) and a feedback capacitor coupled between the negative (−) input terminal of the amplifier and the output terminal of the amplifier, i.e., coupled to a feedback path. Here, the positive (+) input terminal of the amplifier may be connected to the ground. Also, the receiver may further include a reset switch which is connected in parallel with the feedback capacitor. The reset switch may reset the conversion from current to voltage that is performed by the receiver. The negative input terminal of the amplifier is connected to the corresponding receiving electrode RX and receives and integrates a current signal including information on the capacitance (Cm) 14, and then converts the integrated current signal into voltage. The sensing unit 11 may further include an analog to digital converter (ADC) (not shown) which converts the integrated data by the receiver into digital data. Later, the digital data may be input to a processor (not shown) and processed to obtain information on the touch on the touch sensor 10. The sensing unit 11 may include the ADC and processor as well as the receiver.

A controller 13 may perform a function of controlling the operations of the driving unit 12 and the sensing unit 11. For example, the controller 13 generates and transmits a drive control signal to the driving unit 12, so that the driving signal can be applied to a predetermined drive electrode TX1 at a predetermined time. Also, the controller 13 generates and transmits the drive control signal to the sensing unit 11, so that the sensing unit 11 may receive the sensing signal from the predetermined receiving electrode RX at a predetermined time and perform a predetermined function.

In FIG. 1a, the driving unit 12 and the sensing unit 11 may constitute a touch detection device (not shown) capable of detecting whether the touch has occurred on the touch sensor 10 or not and where the touch has occurred. The touch detection device may further include the controller 13. In the touch input device including the touch sensor 10, the touch detection device may be integrated and implemented on a touch sensing integrated circuit (IC) corresponding to a below-described touch sensor controller 1100. The drive electrode TX and the receiving electrode RX included in the touch sensor 10 may be connected to the driving unit 12 and the sensing unit 11 included in the touch sensing IC through, for example, a conductive trace and/or a conductive pattern printed on a circuit board, or the like. The touch sensing IC may be placed on a circuit board on which the conductive pattern has been printed, for example, a touch circuit board (hereafter, referred to as a touch PCB) in FIGS. 6a to 6i. According to the embodiment, the touch sensing IC may be mounted on a main board for operation of the touch input device.

As described above, a capacitance (Cm) with a predetermined value is generated at each crossing of the drive electrode TX and the receiving electrode RX. When an object like a finger approaches close to the touch sensor 10, the value of the capacitance may be changed. In FIG. 1a, the capacitance may represent a mutual capacitance (Cm). The sensing unit 11 senses such electrical characteristics, thereby being able to sense whether the touch has occurred on the touch sensor 10 or not and where the touch has occurred. For example, the sensing unit 11 is able to sense whether the touch has occurred on the surface of the touch sensor 10 comprised of a two-dimensional plane consisting of a first axis and a second axis.

More specifically, when the touch occurs on the touch sensor 10, the drive electrode TX to which the driving signal has been applied is detected, so that the position of the second axial direction of the touch can be detected. Likewise, when the touch occurs on the touch sensor 10, the capacitance change is detected from the reception signal received through the receiving electrode RX, so that the position of the first axial direction of the touch can be detected.

Up to now, although the operation mode of the touch sensor 10 sensing the touch position has been described on the basis of the mutual capacitance change amount between the drive electrode TX and the receiving electrode RX, the embodiment of the present invention is not limited to this. That is, as shown in FIG. 1b, it is also possible to detect the touch position on the basis of the change amount of a self-capacitance.

Figure 1B:
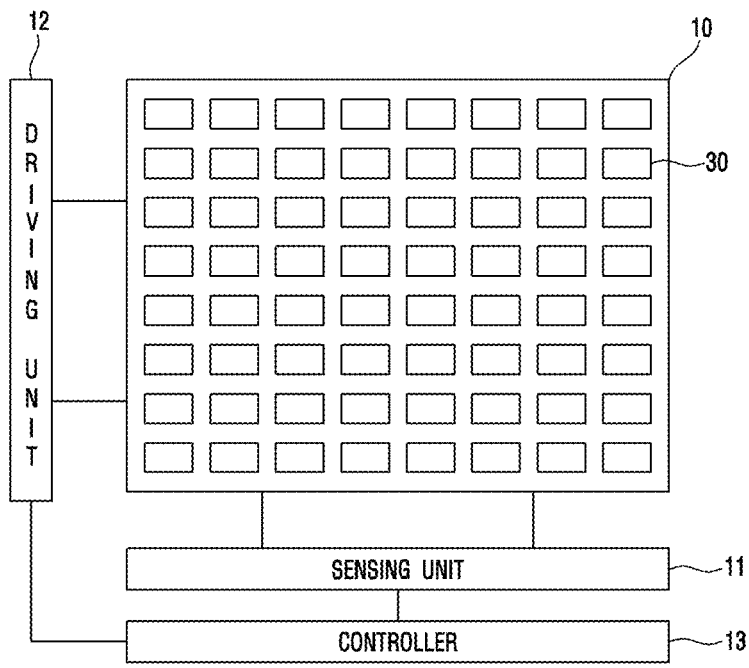

FIG. 1b is schematic views of a configuration of another capacitance type touch sensor 10 included in the touch input device according to another embodiment of the present invention and the operation of the capacitance type touch sensor. A plurality of touch electrodes 30 are provided on the touch sensor 10 shown in FIG. 1b. Although the plurality of touch electrodes 30 may be, as shown in FIG. 7d, disposed at a regular interval in the form of a grid, the present invention is not limited to this.

The drive control signal generated by the controller 13 is transmitted to the driving unit 12. On the basis of the drive control signal, the driving unit 12 applies the drive signal to the predetermined touch electrode 30 for a predetermined time period. Also, the drive control signal generated by the controller 13 is transmitted to the sensing unit 11. On the basis of the drive control signal, the sensing unit 11 receives the sensing signal from the predetermined touch electrode 30 for a predetermined time period. Here, the sensing signal may be a signal for the change amount of the self-capacitance formed on the touch electrode 30.

Here, whether the touch has occurred on the touch sensor 10 or not and/or the touch position are detected by the sensing signal detected by the sensing unit 11. For example, since the coordinate of the touch electrode 30 has been known in advance, whether the touch of the object on the surface of the touch sensor 10 has occurred or not and/or the touch position can be detected.

In the foregoing, for convenience of description, it has been described that the driving unit 12 and the sensing unit 11 operate individually as a separate block. However, the operation to apply the drive signal to the touch electrode 30 and to receive the sensing signal from the touch electrode 30 can be also performed by one drive and sensing unit.

The foregoing has described in detail the capacitance type touch sensor as the touch sensor 10. However, in the touch input device 1000 according to the embodiment of the present invention, the touch sensor 10 for detecting whether or not the touch has occurred and the touch position may be implemented by using not only the above-described method but also any touch sensing method such as a surface capacitance type method, a projected capacitance type method, a resistance film method, a surface acoustic wave (SAW) method, an infrared method, an optical imaging method, a dispersive signal technology, and an acoustic pulse recognition method, etc.

Figure 2:
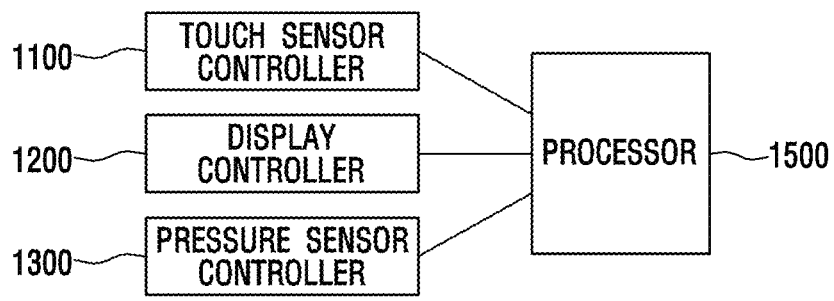
FIG. 2 shows a control block for controlling a touch position, a touch pressure, and a display operation in the touch input device according to the embodiment of the present invention.

FIG. 2 shows a control block for controlling the touch position, a touch pressure and a display operation in the touch input device according to the embodiment of the present invention. In the touch input device 1000 configured to detect the touch pressure in addition to the display function and touch position detection, the control block may include the above-described touch sensor controller 1100 for detecting the touch position, a display controller 1200 for driving the display panel, and a pressure sensor controller 1300 for detecting a force (or pressure).

The display controller 1200 may include a control circuit which receives an input from an application processor (AP) or a central processing unit (CPU) on a main board for the operation of the touch input device 1000 and displays the desired contents on the display panel 200A. The control circuit may be mounted on a display circuit board (hereafter, referred to as a display PCB). The control circuit may include a display panel control IC, a graphic controller IC, and a circuit required to operate other display panel 200A.

The pressure sensor controller 1300 for detecting the pressure through a pressure sensor may be configured similarly to the touch sensor controller 1100, and thus, may operate similarly to the touch sensor controller 1100. Specifically, as shown in FIGS. 1a and 1b, the pressure sensor controller 1300 may include the driving unit, the sensing unit, and the controller, and may detect a magnitude of the pressure by the sensing signal sensed by the sensing unit. Here, the pressure sensor controller 1300 may be mounted on the touch PCB on which the touch sensor controller 1100 has been mounted or may be mounted on the display PCB on which the display controller 1200 has been mounted.

According to the embodiment, the touch sensor controller 1100, the display controller 1200, and the pressure sensor controller 1300 may be included as different components in the touch input device 1000. For example, the touch sensor controller 1100, the display controller 1200, and the pressure sensor controller 1300 may be composed of different chips respectively. Here, a processor 1500 of the touch input device 1000 may function as a host processor for the touch sensor controller 1100, the display controller 1200, and the pressure sensor controller 1300.

The touch input device 1000 according to the embodiment of the present invention may include an electronic device including a display screen and/or a touch screen, such as a cell phone, a personal data assistant (PDA), a smartphone, a tablet personal computer (PC).

In order to manufacture such a thin and lightweight light-weighing touch input device 1000, the touch sensor controller 1100, the display controller 1200, and the pressure sensor controller 1300, which are, as described above, formed separately from each other, may be integrated into one or more configurations in accordance with the embodiment of the present invention. In addition to this, these controllers can be integrated into the processor 1500 respectively. Also, according to the embodiment of the present invention, the touch sensor 10 and/or the pressure sensor may be integrated into the display panel 200A.

In the touch input device 1000 according to the embodiment of the present invention, the touch sensor 10 for detecting the touch position may be positioned outside or inside the display panel 200A. The display panel 200A of the touch input device 1000 according to the embodiment of the present invention may be a display panel included in a liquid crystal display (LCD), a plasma display panel (PDP), an organic light emitting diode (OLED), etc. Accordingly, a user may perform the input operation by touching the touch surface while visually identifying an image displayed on the display panel.

Figure 3A:
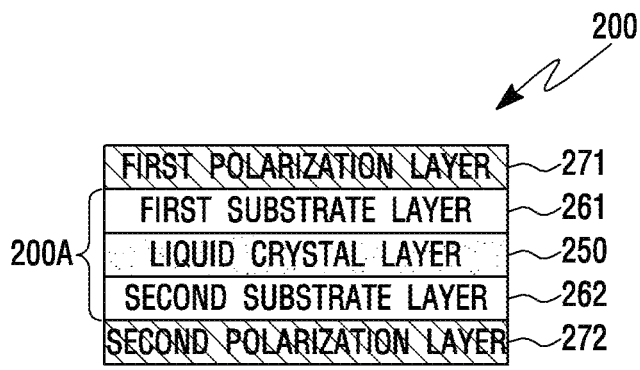
FIGS. 3a and 3b are conceptual views for describing a configuration of a display module in the touch input device according to the embodiment of the present invention.
Figure 3B:
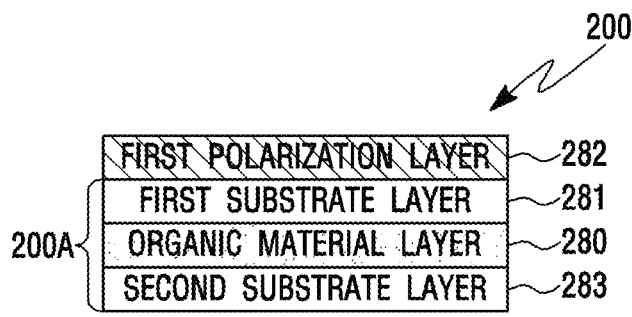

FIGS. 3a and 3b are conceptual views for describing a configuration of a display module 200 in the touch input device 1000 according to the embodiment of the present invention. First, the configuration of the display module 200 including the display panel 200A using an LCD panel will be described with reference to FIG. 3a.

As shown in FIG. 3a, the display module 200 may include the display panel 200A that is an LCD panel, a first polarization layer 271 disposed on the display panel 200A, and a second polarization layer 272 disposed under the display panel 200A. The display panel 200A that is an LCD panel may include a liquid crystal layer 250 including a liquid crystal cell, a first substrate layer 261 disposed on the liquid crystal layer 250, and a second substrate layer 262 disposed under the liquid crystal layer 250. Here, the first substrate layer 261 may be made of color filter glass, and the second substrate layer 262 may be made of TFT glass. Also, according to the embodiment, at least one of the first substrate layer 261 and the second substrate layer 262 may be made of a bendable material such as plastic. In FIG. 3a, the second substrate layer 262 may be comprised of various layers including a data line, a gate line, TFT, a common electrode, and a pixel electrode, etc. These electrical components may operate in such a manner as to generate a controlled electric field and orient liquid crystals located in the liquid crystal layer 250.

Next, the configuration of the display module 200 including the display panel 200A using an OLED panel will be described with reference to FIG. 3b.

As shown in FIG. 3b, the display module 200 may include the display panel 200A that is an OLED panel, and a first polarization layer 282 disposed on the display panel 200A. The display panel 200A that is an OLED panel may include an organic material layer 280 including an organic light-emitting diode (OLED), a first substrate layer 281 disposed on the organic material layer 280, and a second substrate layer 283 disposed under the organic material layer 280. Here, the first substrate layer 281 may be made of encapsulation glass, and the second substrate layer 283 may be made of TFT glass. Also, according to the embodiment, at least one of the first substrate layer 281 and the second substrate layer 283 may be made of a bendable material such as plastic. The OLED panel shown in FIG. 3b may include an electrode used to drive the display panel 200A, such as a gate line, a data line, a first power line (ELVDD), a second power line (ELVSS), etc. The organic light-emitting diode (OLED) panel is a self-light emitting display panel which uses a principle where, when current flows through a fluorescent or phosphorescent organic thin film and then electrons and electron holes are combined in the organic material layer, so that light is generated. The organic material constituting the light emitting layer determines the color of the light.

Specifically, the OLED uses a principle in which when electricity flows and an organic matter is applied on glass or plastic, the organic matter emits light. That is, the principle is that electron holes and electrons are injected into the anode and cathode of the organic matter respectively and are recombined in the light emitting layer, so that a high energy exciton is generated and the exciton releases the energy while falling down to a low energy state and then light with a particular wavelength is generated. Here, the color of the light is changed according to the organic matter of the light emitting layer.

The OLED includes a line-driven passive-matrix organic light-emitting diode (PM-OLED) and an individual driven active-matrix organic light-emitting diode (AM-OLED) in accordance with the operating characteristics of a pixel constituting a pixel matrix. None of them require a backlight. Therefore, the OLED enables a very thin display module to be implemented, has a constant contrast ratio according to an angle and obtains a good color reproductivity depending on a temperature. Also, it is very economical in that non-driven pixel does not consume power.

In terms of operation, the PM-OLED emits light only during a scanning time at a high current, and the AM-OLED maintains a light emitting state only during a frame time at a low current. Therefore, the AM-OLED has a resolution higher than that of the PM-OLED and is advantageous for driving a large area display panel and consumes low power. Also, a thin film transistor (TFT) is embedded in the AM-OLED, and thus, each component can be individually controlled, so that it is easy to implement a delicate screen.

Also, the organic material layer 280 may include a hole injection layer (HIL), a hole transport layer (HTL), an electron injection layer (EIL), an electron transport layer (ETL), and a light-emitting layer (EML).

Briefly describing each of the layers, HIL injects electron holes and is made of a material such as CuPc, etc. HTL functions to move the injected electron holes and mainly is made of a material having a good hole mobility. The HTL may be made of Arylamine, TPD, and the like. The EIL and ETL inject and transport electrons. The injected electrons and electron holes are combined in the EML and emit light. The EML represents the color of the emitted light and is composed of a host determining the lifespan of the organic matter and an impurity (dopant) determining the color sense and efficiency. This just describes the basic structure of the organic material layer 280 include in the OLED panel. The present invention is not limited to the layer structure or material, etc., of the organic material layer 280.

The organic material layer 280 is inserted between an anode (not shown) and a cathode (not shown). When the TFT becomes an on-state, a driving current is applied to the anode and the electron holes are injected, and the electrons are injected to the cathode. Then, the electron holes and electrons move to the organic material layer 280 and emit the light.

It will be apparent to a skilled person in the art that the LCD panel or the OLED panel may further include other structures so as to perform the display function and may be transformed.

The display module 200 of the touch input device 1000 according to the embodiment of the present invention may include the display panel 200A and a configuration for driving the display panel 200A. Specifically, when the display panel 200A is an LCD panel, the display module 200 may include a backlight unit (not shown) disposed under the second polarization layer 272 and may further include a display panel control IC for operation of the LCD panel, a graphic control IC, and other circuits.

In the touch input device 1000 according to the embodiment of the present invention, the touch sensor 10 for detecting the touch position may be positioned outside or inside the display module 200.

When the touch sensor 10 in the touch input device 1000 positioned outside the display module 200, the touch sensor panel may be disposed on the display module 200, and the touch sensor 10 may be included in the touch sensor panel. The touch surface of the touch input device 1000 may be the surface of the touch sensor panel.

When the touch sensor 10 in the touch input device 1000 positioned inside the display module 200, the touch sensor 10 may be configured to be positioned outside the display panel 200A. Specifically, the touch sensor 10 may be formed on the top surfaces of the first substrate layers 261 and 281. Here, the touch surface of the touch input device 1000 may be an outer surface of the display module 200 and may be the top surface or bottom surface in FIGS. 3 and 3b.

When the touch sensor 10 in the touch input device 1000 positioned inside the display module 200, at least a portion of the touch sensor 10 may be configured to be positioned inside the display panel 200A, and at least a portion of the remaining touch sensor 10 may be configured to be positioned outside the display panel 200A. For example, any one of the drive electrode TX and the receiving electrode RX, which constitute the touch sensor 10, may be configured to be positioned outside the display panel 200A, and the other may be configured to be positioned inside the display panel 200A. Specifically, any one of the drive electrode TX and the receiving electrode RX, which constitute the touch sensor 10, may be formed on the top surface of the top surfaces of the first substrate layers 261 and 281, and the other may be formed on the bottom surfaces of the first substrate layers 261 and 281 or may be formed on the top surfaces of the second substrate layers 262 and 283.

When the touch sensor 10 in the touch input device 1000 positioned inside the display module 200, the touch sensor 10 may be configured to be positioned inside the display panel 200A. Specifically, the touch sensor 10 may be formed on the bottom surfaces of the first substrate layers 261 and 281 or may be formed on the top surfaces of the second substrate layers 262 and 283.

When the touch sensor 10 is positioned inside the display panel 200A, an electrode for operation of the touch sensor may be additionally disposed. However, various configurations and/or electrodes positioned inside the display panel 200A may be used as the touch sensor 10 for sensing the touch. Specifically, when the display panel 200A is the LCD panel, at least any one of the electrodes included in the touch sensor 10 may include at least any one of a data line, a gate line, TFT, a common electrode (Vcom), and a pixel electrode. When the display panel 200A is the OLED panel, at least any one of the electrodes included in the touch sensor 10 may include at least any one of a data line, a gate line, a first power line (ELVDD), and a second power line (ELVSS).

Here, the touch sensor 10 may function as the drive electrode and the receiving electrode described in FIG. 1a and may detect the touch position in accordance with the mutual capacitance between the drive electrode and the receiving electrode. Also, the touch sensor 10 may function as the single electrode 30 described in FIG. 1b and may detect the touch position in accordance with the self-capacitance of each of the single electrodes 30. Here, if the electrode included in the touch sensor 10 is used to drive the display panel 200A, the electrode may drive the display panel 200A in a first time interval and may detect the touch position in a second time interval different from the first time interval.

In the touch input device 1000 according to the embodiment of the present invention, by means of an adhesive like an optically clear adhesive (OCA), lamination may occur between a cover layer 100 on which the touch sensor for detecting the touch position has been formed and the display module 200 including the display panel 200A. As a result, the display color clarity, visibility and optical transmittance of the display module 200, which can be recognized through the touch surface of the touch sensor, can be improved.

The foregoing has described the touch input device 1000 including the touch sensor panel 100 capable of detecting whether or not the touch has occurred and/or the touch position. By applying a pressure detection module according to the embodiment of the present invention to the above-described touch input device 1000, it is possible to easily detect the magnitude of the touch pressure as well as whether or not the touch has occurred and/or the touch position. Particularly, for the purpose of mitigating the impact on the display module 200 and for maintaining the image quality of the display panel 200A, the touch input device 1000 may be manufacture such that the pressure sensor and an elastic material are inserted between a substrate 300 and the display module 200. In the embodiment, it is intended not only to ensure the mitigation of the impact on the display module 200 and the quality of the display module by combining the elastic material with the pressure sensor but also to stably maintain a gap for the pressure detection. Hereafter, described in detail is an example of a case of detecting the touch pressure by applying the pressure sensor according to the embodiment of the present invention to the touch input device 1000.

FIGS. 4a to 4f show an example in which the pressure sensor is formed in the in the touch input device according to the embodiment of the present invention.

Figure 4A:
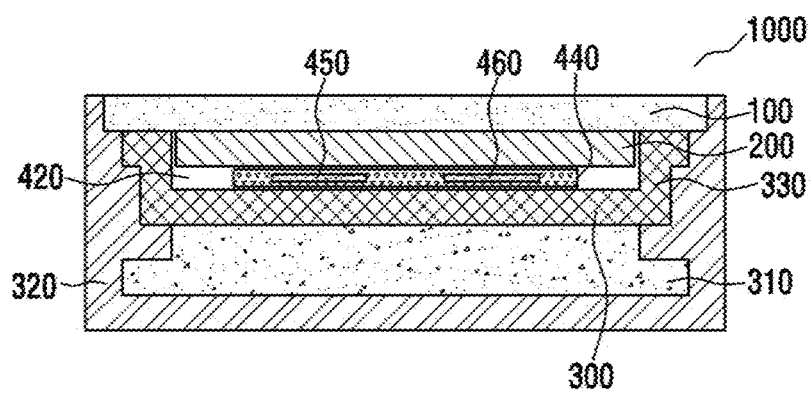
FIGS. 4a to 4f show an example in which a pressure sensor is formed in the in the touch input device according to the embodiment of the present invention.

In FIG. 4a and some of the following figures, it is shown that the display panel 200A is directly laminated on and attached to the cover layer 100. However, this is only for convenience of description. The display module 200 where the first polarization layers 271 and 282 is located on the display panel 200A may be laminated on and attached to the cover layer 100. When the LCD panel is the display panel 200A, the second polarization layer 272 and the backlight unit are omitted.

Figure 4B:
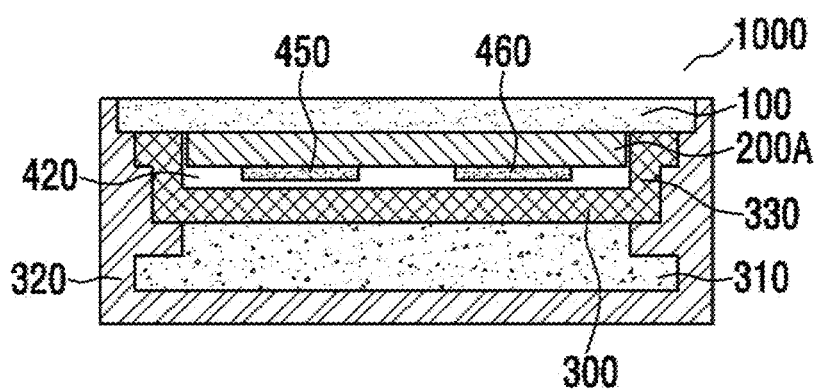
Figure 4C:
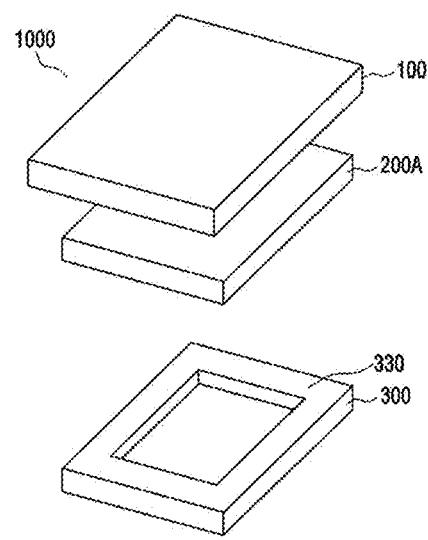

In the description with reference to FIGS. 4a to 4f, it is shown that as the touch input device 1000 according to the embodiment of the present invention, the cover layer 100 in which the touch sensor has been formed is laminated on and attached to the display module 200 shown in FIGS. 3a and 3b by means of an adhesive. However, the touch input device 1000 according to the embodiment of the present invention may include that the touch sensor 10 is disposed inside the display module 200 shown in FIGS. 3a and 3b. More specifically, while FIGS. 4a to 4c show that the cover layer 100 where the touch sensor 10 has been formed covers the display module 200 including the display panel 200A, the touch input device 1000 which includes the touch sensor 10 disposed inside the display module 200 and includes the display module 200 covered with the cover layer 100 like glass may be used as the embodiment of the present invention.

The touch input device 1000 according to the embodiment of the present invention may include an electronic device including the touch screen, for example, a cell phone, a personal data assistant (PDA), a smart phone, a tablet personal computer, an MP3 player, a laptop computer, etc.

In the touch input device 1000 according to the embodiment of the present invention, a substrate 300, together with an outermost housing 320 of the touch input device 1000, may function to surround a mounting space 310, etc., where the circuit board and/or battery for operation of the touch input device 1000 are placed. Here, the circuit board for operation of the touch input device 1000 may be a main board. A central processing unit (CPU), an application processor (AP) or the like may be mounted on the circuit board. Due to the substrate 300, the display module 200 is separated from the circuit board and/or battery for operation of the touch input device 1000. Due to the substrate 300, electrical noise generated from the display module 200 and noise generated from the circuit board can be blocked.

The touch sensor 10 or the cover layer 100 of the touch input device 1000 may be formed wider than the display module 200, the substrate 300, and the mounting space 310. As a result, the housing 320 may be formed such that the housing 320, together with the touch sensor 10, surrounds the display module 200, the substrate 300, and the circuit board. The touch input device 1000 according to the embodiment of the present invention may detect the touch position through the touch sensor 10 and may detect the touch pressure by disposing a separate electrode which is different from the electrode used to detect the touch position and the electrode used to drive the display and by using the separate electrode as the pressure sensor. Here, the touch sensor 10 may be disposed inside or outside the display module 200.

Hereafter, the components for sensing or detecting the pressure are collectively referred to as a pressure sensing unit 400. The pressure sensing unit 400 may be the pressure detection module.

In the embodiment, the pressure sensing unit 400 may include the pressure sensors 450 and 460 and/or a spacer layer 420. Here, the pressure sensing unit 400 of FIG. 4a may include the pressure sensors 450 and 460 and/or the spacer layer 420 and further may include an electrode sheet 440. The pressure sensors 450 and 460 may be disposed within the electrode sheet 440, and the electrode sheet 440 may be attached to the display module 200. Here, the pressure sensing unit 400 of FIG. 4b may include the pressure sensors 450 and 460 and/or the spacer layer 420, and the pressure sensors 450 and 460 may be directly formed on the display module 200.

Also, the pressure sensing unit 400 is formed to include, for example, the spacer layer 420 composed of an air gap. This will be described in detail with reference to FIGS. 4a to 4f.

According to the embodiment, the spacer layer 420 may be implemented by the air gap. According to the embodiment, the spacer layer 420 may be made of an impact absorbing material. According to the embodiment, the spacer layer 420 may be filled with a dielectric material. According to the embodiment, the spacer layer 420 may be made of a material having a restoring force by which the material contracts by applying the pressure and returns to its original shape by releasing the pressure. According to the embodiment, the spacer layer 420 may be made of an elastic foam. Also, since the spacer layer is disposed under the display module 200, the spacer layer may be made of a transparent material or an opaque material.

Also, a reference potential layer may be disposed under the display module 200. Specifically, the reference potential layer may be formed on the substrate 300 disposed under the display module 200. Alternatively, the substrate 300 itself may serve as the reference potential layer. Also, the reference potential layer may be disposed on the cover (not shown) which is disposed on the substrate 300 and under the display module 200 and functions to protect the display module 200. Alternatively, the cover itself may serve as the reference potential layer. When a pressure is applied to the touch input device 1000, the display panel 200A is bent. Due to the bending of the display panel 200A, a distance between the reference potential layer and the pressure sensing unit 400 may be changed. Also, the spacer layer may be disposed between the reference potential layer and the pressure sensing unit 400. Specifically, the spacer layer may be disposed between the display module 200 and the substrate 300 where the reference potential layer has been disposed or between the display module 200 and the cover where the reference potential layer has been disposed.

Also, the reference potential layer may be disposed inside the display module 200. Specifically, the reference potential layer may be disposed on the top surfaces or bottom surfaces of the first substrate layers 261 and 281 of the display panel 200A or on the top surfaces or bottom surfaces of the second substrate layers 262 and 283. When a pressure is applied to the touch input device 1000, the display panel 200A is bent. Due to the bending of the display panel 200A, the distance between the reference potential layer and the pressure sensing unit 400 may be changed. Also, the spacer layer may be disposed between the reference potential layer and the pressure sensing unit 400. In the case of the touch input device 1000 shown in FIGS. 3a and 3b, the spacer layer may be disposed on or inside the display panel 200A.

Likewise, according to the embodiment, the spacer layer 420 may be implemented by the air gap. According to the embodiment, the spacer layer may be made of an impact absorbing material. According to the embodiment, the spacer layer may be filled with a dielectric material. According to the embodiment, the spacer layer may be made of a material having a restoring force by which the material contracts by applying the pressure and returns to its original shape by releasing the pressure. According to the embodiment, the spacer layer may be made of an elastic foam. Also, since the spacer layer is disposed on or inside the display panel 200A, the spacer layer may be made of a transparent material.

According to the embodiment, when the spacer layer is disposed inside the display module 200, the spacer layer may be the air gap which is included during the manufacture of the display panel 200A and/or the backlight unit. When the display panel 200A and/or the backlight unit includes one air gap, the one air gap may function as the spacer layer. When the display panel 200A and/or the backlight unit includes a plurality of the air gaps, the plurality of air gaps may collectively function as the spacer layer.

Hereafter, for the purpose of clearly distinguishing the electrodes 450 and 460 from the electrode included in the touch sensor 10, the electrodes 450 and 460 for detecting the pressure are designated as the pressure sensors 450 and 460. Here, since the pressure sensors 450 and 460 are disposed in the rear side instead of in the front side of the display panel 200A, the pressure sensor 450 and 460 may be made of an opaque material as well as a transparent material. When the display panel 200A is the LCD panel, the light from the backlight unit must transmit through the pressure sensors 450 and 460. Therefore, the pressure sensors 450 and 460 may be made of a transparent material such as ITO.

Here, a frame 330 having a predetermined height may be formed along the border of the upper portion of the substrate 300 in order to maintain the spacer layer 420 in which the pressure sensor 450 and 460 are disposed. Here, the frame 330 may be bonded to the cover layer 100 by means of an adhesive layer (not shown). Here, the adhesive layer may be an adhesive tape. While FIG. 4b shows the frame 330 is formed on the entire border (e.g., four sides of the quadrangle) of the substrate 300, the frame 330 may be formed only on at least some (e.g., three sides of the quadrangle) of the border of the substrate 300. According to the embodiment, the frame 330 may be formed on the top surface of the substrate 300 may be integrally formed with the substrate 300 on the top surface of the substrate 300. In the embodiment of the present invention, the frame 330 may be made of an inelastic material. In the embodiment of the present invention, when a pressure is applied to the display panel 200A through the cover layer 100, the display panel 200A, together with the cover layer 100, may be bent. Therefore, the magnitude of the touch pressure can be detected even though the frame 330 is not transformed by the pressure.

Figure 4D:
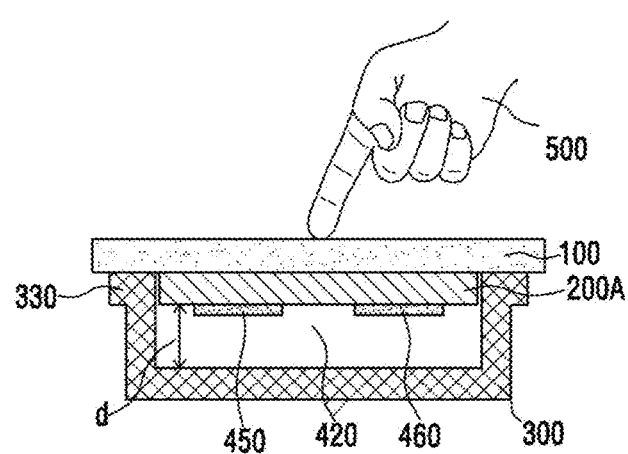

FIG. 4d is a cross sectional view of the touch input device including the pressure sensor according to the embodiment of the present invention. As shown in FIG. 4d, the pressure sensors 450 and 460 according to the embodiment of the present invention may be formed within the spacer layer 420 and on the bottom surface of the display panel 200A.

The pressure sensor for detecting the pressure may include the first pressure sensor 450 and the second pressure sensor 460. Here, any one of the first pressure sensor 450 and the second pressure sensor 460 may be the drive electrode, and the other may be the receiving electrode. A drive signal is applied to the drive electrode, and a sensing signal may be obtained through the receiving electrode. When a voltage is applied, a mutual capacitance may be generated between the first pressure sensor 450 and the second pressure sensor 460.

Figure 4E:
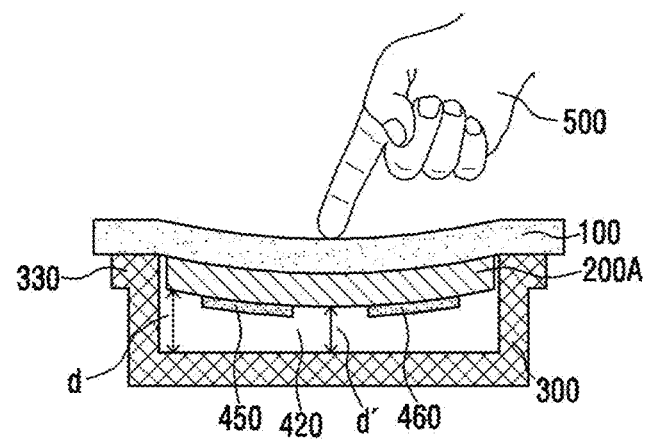

FIG. 4e is a cross sectional view when a pressure is applied to the touch input device 1000 shown in FIG. 4d. The top surface of the substrate 300 may have a ground potential so as to block the noise. When a pressure is applied to the surface of the cover layer 100 by an object 500, the cover layer 100 and the display panel 200A may be bent or pressed. As a result, a distance "d" between the ground potential surface and the pressure sensors 450 and 460 may be decreased to "d'". In this case, due to the decrease of the distance "d", the fringing capacitance is absorbed in the top surface of the substrate 300, so that the mutual capacitance between the first pressure sensor 450 and the second pressure sensor 460 may be reduced. Therefore, the magnitude of the touch pressure can be calculated by obtaining the reduction amount of the mutual capacitance from the sensing signal obtained through the receiving electrode.

Although it has been described in FIG. 4e that the top surface of the substrate 300 has the ground potential, that is to say, is the reference potential layer, the reference potential layer may be disposed inside the display module 200. Here, when a pressure is applied to the surface of the cover layer 100 by the object 500, the cover layer 100 and the display panel 200A may be bent or pressed. As a result, a distance between the pressure sensors 450 and 460 and the reference potential layer disposed inside the display module 200 is changed. Therefore, the magnitude of the touch pressure can be calculated by obtaining the capacitance change amount from the sensing signal obtained through the receiving electrode.

In the touch input device 1000 according to the embodiment of the present invention, the display panel 200A may be bent or pressed by the touch applying the pressure. When the display panel 200A is bent or pressed according to the embodiment, a position showing the biggest transformation may not match the touch position. However, the display panel 200A may be shown to be bent at least at the touch position. For example, when the touch position approaches close to the border, edge, etc., of the display panel 200A, the most bent or pressed position of the display panel 200A may not match the touch position, however, the display panel 200A may be shown to be bent or pressed at least at the touch position.

In the state where the first pressure sensor 450 and the second pressure sensor 460 are formed in the same layer, each of the first pressure sensor 450 and the second pressure sensor 460 shown in FIGS. 4d and 4e may be, as shown in FIG. 14a, composed of a plurality of lozenge-shaped electrodes. Here, the plurality of the first pressure sensors 450 are connected to each other in the first axial direction, and the plurality of the second pressure sensors 460 are connected to each other in the second axial direction orthogonal to the first axial direction. The lozenge-shaped electrodes of at least one of the first pressure sensor 450 and the second pressure sensor 460 are connected to each other through a bridge, so that the first pressure sensor 450 and the second pressure sensor 460 may be insulated from each other. Also, here, the first pressure sensor 450 and the second pressure sensor 460 may be composed of an electrode having a form shown in FIG. 14b.

In the foregoing, it is shown that the touch pressure is detected from the change of the mutual capacitance between the first pressure sensor 450 and the second pressure sensor 460. However, the pressure sensing unit 400 may be configured to include only any one of the first pressure sensor 450 and the second pressure sensor 460. In this case, it is possible to detect the magnitude of the touch pressure by detecting the change of the capacitance between the one pressure sensor and a ground layer (the reference potential layer disposed inside the display module 200 or the substrate 300), that is to say, the change of the self-capacitance. Here, the drive signal is applied to the one pressure sensor, and the change of the self-capacitance between the pressure sensor and the ground layer can be detected by the pressure sensor.

Figure 14D:
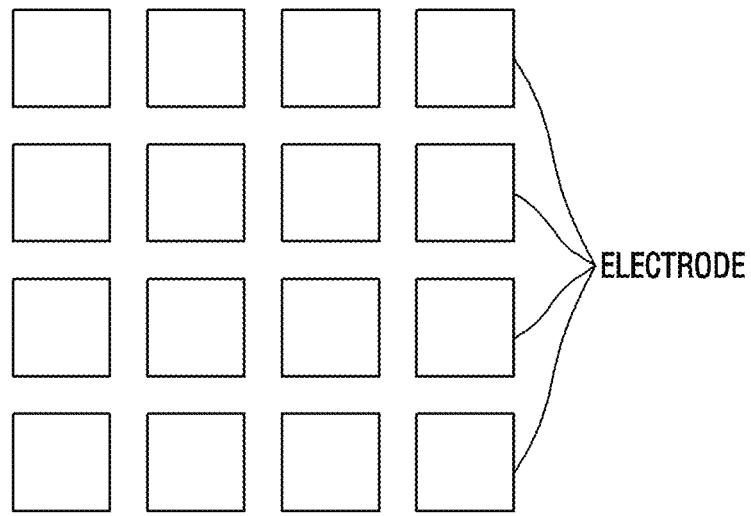

For instance, in FIG. 4d, the pressure sensor may be configured to include only the first pressure sensor 450. Here, the magnitude of the touch pressure can be detected by the change of the capacitance between the first pressure sensor 450 and the substrate 300, which is caused by a distance change between the substrate 300 and the first pressure sensor 450. Since the distance "d" is reduced with the increase of the touch pressure, the capacitance between the substrate 300 and the first pressure sensor 450 may be increased with the increase of the touch pressure. Here, the pressure sensor should not necessary have a comb teeth shape or a trident shape, which is required to improve the detection accuracy of the mutual capacitance change amount. The pressure sensor may have a plate shape (e.g., quadrangular plate). Alternatively, as shown in FIG. 14d, the plurality of the first pressure sensors 450 may be disposed at a regular interval in the form of a grid.

Figure 4F:
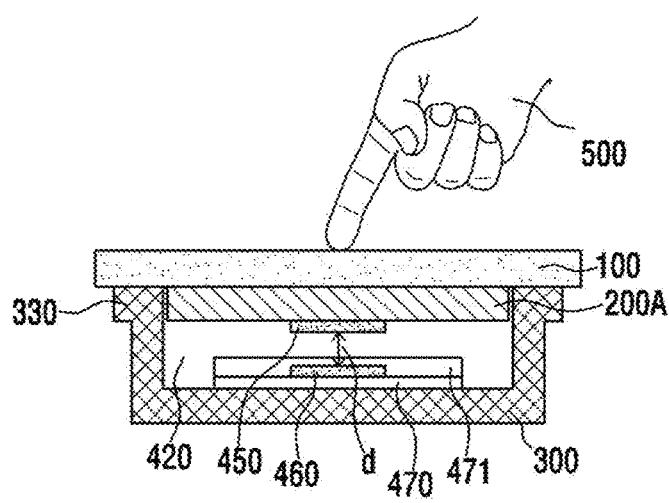

FIG. 4f shows that the pressure sensors 450 and 460 are formed within the spacer layer 420 and on the top surface of the substrate 300 and on the bottom surface of the display panel 200A. Here, the first pressure sensor 450 may be formed on the bottom surface of the display panel 200A, and the second pressure sensor 460 may be disposed on the top surface of the substrate 300 in the form of the electrode sheet in which the second pressure sensor 460 is formed on a first insulation layer 470 and a second insulation layer 471 is formed on the second pressure sensor 460. The first pressure sensor 450 and the second pressure sensor 460 may be configured as shown in FIG. 14c.

When the object 500 applies a pressure to the surface of the cover layer 100, the cover layer 100 and the display panel 200A may be bent or pressed. As a result, a distance "d" between the first pressure sensor 450 and the second pressure sensor 460 may be reduced. In this case, the mutual capacitance between the first pressure sensor 450 and the second pressure sensor 460 may be increased with the reduction of the distance "d". Therefore, the magnitude of the touch pressure can be calculated by obtaining the increase amount of the mutual capacitance from the sensing signal obtained through the receiving electrode. Here, in FIG. 4f, since the first pressure sensor 450 and the second pressure sensor 460 are formed in different layers, the first pressure sensor 450 and the second pressure sensor 460 should not necessary have a comb teeth shape or a trident shape. Any one sensor of the first pressure sensor 450 and the second pressure sensor 460 may have a plate shape (e.g., quadrangular plate), and the other may have a shape in which the plurality of the electrodes are, as shown in FIG. 14d, disposed at a regular interval in the form of a grid.

FIGS. 5a to 5e show a pattern included in the pressure sensor according to the embodiment.

Figure 5A:
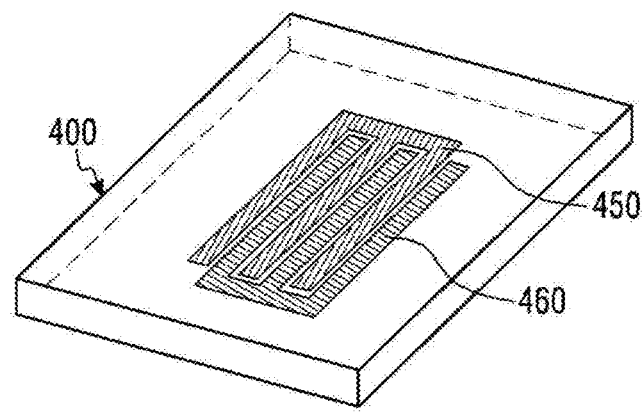
FIGS. 5a to 5e show a pattern included in the pressure sensor according to the embodiment.
Figure 5B:
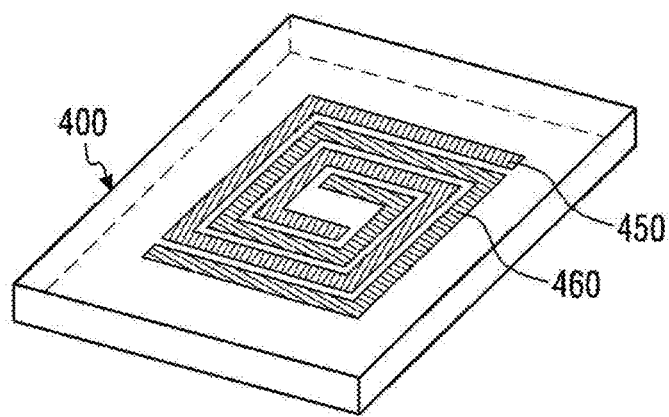
Figure 5C:
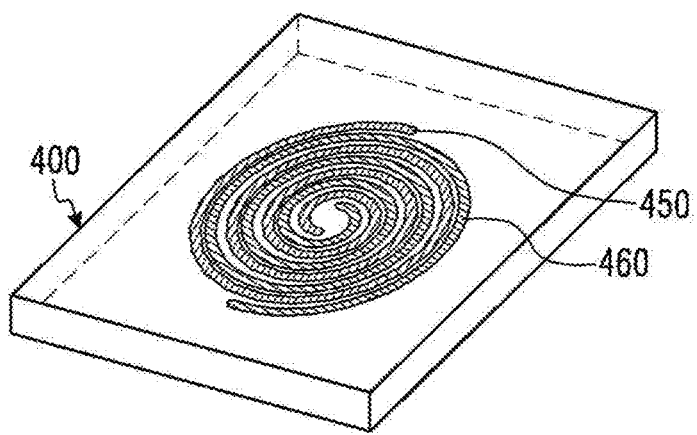

FIGS. 5a to 5c show a pressure sensor pattern which can be applied to the first and the second embodiments. When the magnitude of the touch pressure is detected as the mutual capacitance between the first pressure sensor 450 and the second pressure sensor 460 is changed, it is necessary to form the patterns of the first pressure sensor 450 and the second pressure sensor 460 so as to generate the range of the capacitance required to improve the detection accuracy. With the increase of a facing area or facing length of the first pressure sensor 450 and the second pressure sensor 460, the size of the capacitance that is generated may become larger. Therefore, the pattern can be designed by adjusting the size of the facing area, facing length and facing shape of the first pressure sensor 450 and the second pressure sensor 460 in accordance with the range of the necessary capacitance. FIGS. 5b and 5c show that the first pressure sensor 450 and the second pressure sensor 460 are formed in the same layer, and show that the pressure sensor is formed such that the facing length of the first pressure sensor 450 and the second pressure sensor 460 becomes relatively longer. When the first pressure sensor 450 and the second pressure sensor 460 are positioned in different layers, the first pressure sensor 450 and the second pressure sensor 460 may be implemented so as to overlap each other.

The first and the second embodiments show that the touch pressure is detected from the change of the mutual capacitance between the first pressure sensor 450 and the second pressure sensor 460. However, the pressure sensing unit 400 may be configured to include only any one of the first pressure sensor 450 and the second pressure sensor 460. In this case, it is possible to detect the magnitude of the touch pressure by detecting the change of the capacitance between the one pressure sensor and the ground layer (the reference potential layer disposed inside the display module 200 or the substrate 300), that is to say, the change of the self-capacitance. Here, the drive signal is applied to the one pressure sensor, and the change of the self-capacitance between the pressure sensor and the ground layer can be detected by the pressure sensor.

Figure 5D:
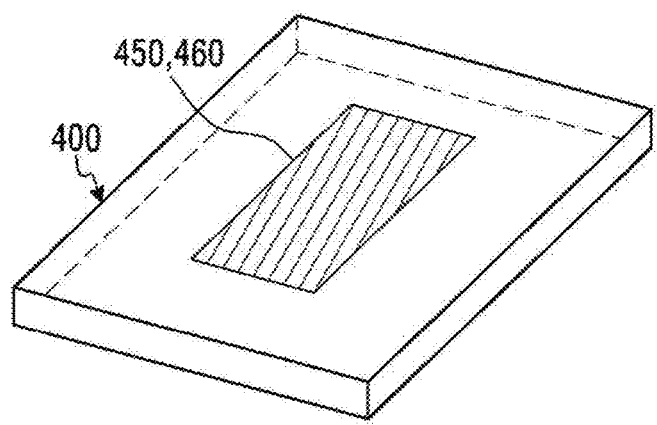

For instance, in FIGS. 4a to 4c, the pressure sensor may be configured to include only the first pressure sensor 450. Here, the magnitude of the touch pressure can be detected by the change of the self-capacitance between the first pressure sensor 450 and the reference potential layer, which is caused by the distance change between the display module 200 and the first pressure sensor 450. Since the distance "d" is reduced with the increase of the touch pressure, the capacitance between the reference potential layer and the first pressure sensor 450 may be increased with the increase of the touch pressure. Here, the pressure sensor should not necessary have a comb teeth shape or a trident shape, which is required to improve the detection accuracy of the mutual capacitance change amount. As shown in FIG. 5d, the pressure sensor may have a plate (e.g., quadrangular plate) shape.

Figure 5E:
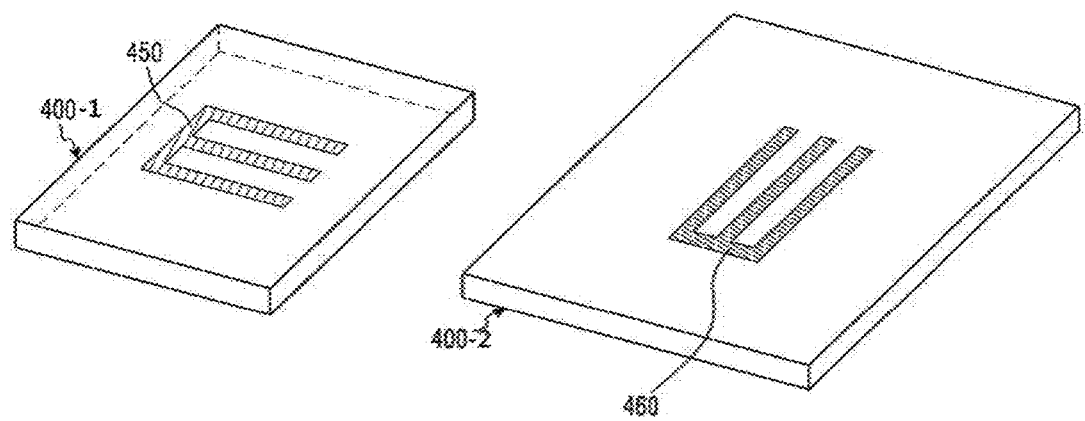

FIG. 5e shows a pressure sensor pattern which can be applied to a third embodiment of the present invention. Since the first pressure sensor 450 and the second pressure sensor 460 are disposed in different layers, they may be implemented so as to overlap each other. As shown in FIG. 5e, the first pressure sensor 450 and the second pressure sensor 460 are disposed perpendicular to each other, so that the capacitance change amount detection sensitivity can be enhanced. In the third embodiment, as shown in FIG. 5d, the first pressure sensor 450 and the second pressure sensor 460 may be implemented to have a plate shape.

As described above, the pressure sensing unit 400 of the touch input device 1000 may include the pressure sensors 450 and 460 and the spacer layer 420. In the foregoing, the spacer 420 is shown as a space between the substrate 300 and the display module 200. However, the spacer layer 420 is disposed between the reference potential layer (e.g., the substrate 300 or display module 200) and the pressure sensors 450 and 460, so that the spacer layer 420 may be referred to as a component which is pressed by the touch with a pressure.

Here, when the magnitude of the touch pressure on the touch input device 1000 is sensed through the pressure sensors 450 and 460, for the sake of a uniform detection performance, the spacer layer 420 needs to have a uniform bending degree and uniform restoring force. For example, in the case where the touch input device 1000 is touched a plurality of times with the same pressure magnitude, the spacer layer 420 must be pressed to the same degree by the pressure in order to detect the same pressure magnitude each time. For example, when the spacer layer 420 is deformed by the repeated touches and the gap of the spacer layer 420 is reduced, the uniform performance of the pressure sensing unit 400 cannot be ensured. Therefore, it is important to stably obtain the gap of the spacer layer 420 so as to ensure the pressure detection performance of the pressure sensing unit 400.

Accordingly, in the embodiment, an elastic foam having a quick restoring force can be used as such a spacer layer 420. The pressure sensing unit 400 having the elastic foam according to the embodiment may be disposed between the substrate 300 and the display module 200 of the touch input device 1000. The pressure sensing unit 400 is configured to include the elastic foam, so that it is possible to mitigate the impact on the display module 200 even without inserting an additional elastic material between the display module 200 and the substrate 300 and to maintain the image quality of the display panel 200A.

Here, the elastic foam included in the pressure sensing unit 400 according to the embodiment has flexibility for allowing the elastic foam to be deformed, for example, pressed, etc., by the applied impact. Therefore, the elastic foam should not only function to absorb the impact but also have the restoring force to provide the performance uniformity for the pressure detection.

Also, the elastic foam should not only be thick enough to mitigate the impact applied to the display module 200 but also be thick enough to prevent a distance between the pressure sensors 450 and 460 and the reference potential layer from being too large, for the purpose of improving a pressure detection sensitivity. For example, the elastic foam according to the embodiment may have a thickness of from 10 μm to 1 mm. If the thickness of the elastic foam is less than 10 μm, the impact cannot be sufficiently absorbed, and if larger than 1 mm, the distance between the reference potential layer and the pressure sensors 450 and 460 or between the first pressure sensor and the second pressure sensor becomes larger, so that the pressure detection sensitivity may be decreased.

For example, the elastic foam according to the embodiment may include at least any one of polyurethane, polyester, polypropylene, and acrylic.

Figure 6A:
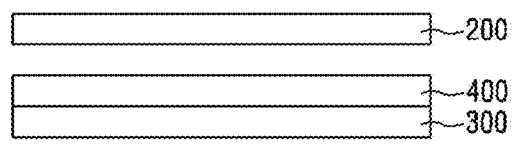
FIGS. 6a and 6b show an attachment position of the pressure sensor to the touch input device according to the embodiment of the present invention.
Figure 6B:
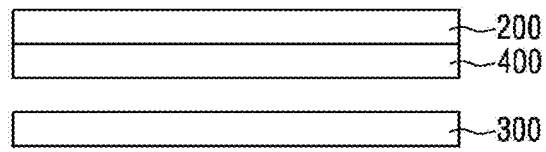

FIGS. 6a and 6b show the attachment position of the pressure sensing unit 400 to the touch input device according to the embodiment of the present invention. As shown in FIG. 6a, the pressure sensing unit 400 may be attached to the top surface of the substrate 300. Also, as shown in FIG. 6b, the pressure sensing unit 400 may be attached to the bottom surface of the display module 200. Hereafter, the case where the pressure sensing unit 400 is attached to the top surface of the substrate 300 will be described first.

FIGS. 7a to 7f show a structural cross section of the pressure sensor according to the embodiment of the present invention.

Figure 7A:
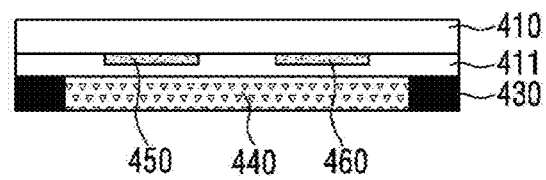
FIGS. 7a to 7f show a structural cross section of the pressure sensor according to the embodiment of the present invention.

As shown in FIG. 7a, the pressure sensors 450 and 460 are disposed between a first insulation layer 410 and a second insulation layer 411 in the pressure sensing unit 400 according to the embodiment. For example, the pressure sensors 450 and 460 may be formed on the first insulation layer 410 and then may be covered with the second insulation layer 411. Here, the first insulation layer 410 and the second insulation layer 411 may be made of an insulating material such as polyimide. The first insulation layer 410 may be polyethylene terephthalate (PET), and the second insulation layer 411 may be a cover layer made of ink. The pressure sensors 450 and 460 may include a material such as copper or aluminum. According to the embodiment, adhesion is performed between the first insulation layer 410 and the second insulation layer 411 and between the pressure sensors 450 and 460 and the first insulation layer 410 by means of an adhesive (not shown) such as a liquid bond. Also, according to the embodiment, the pressure sensors 450 and 460 according to the embodiment may be formed by positioning a mask, which has a through-hole corresponding to a pressure sensor pattern, on the first insulation layer 410, and then by spraying a conductive material.

In FIG. 7a, the pressure sensing unit 400 further includes the elastic foam 440. The elastic foam 440 may be formed on one side of the second insulation layer 411 in a direction opposite to the first insulation layer 410. Later, when the pressure sensing unit 400 is attached to the substrate 300, the elastic foam 440 may be disposed on the substrate 300 on the basis of the second insulation layer 411.

Here, an adhesive layer 430 having a predetermined thickness may be formed on the outside of the elastic foam 440 so as to attach the pressure sensing unit 400 to the substrate 300. According to the embodiment, the adhesive layer 430 may be a double adhesive tape. Here, the adhesive layer 430 may function to adhere the elastic foam 440 to the second insulation layer 411. Here, the adhesive layer 430 is disposed on the outside of the elastic foam 440, thereby effectively reducing the thickness of the pressure sensing unit 400.

When the pressure sensing unit 400 shown in FIG. 7a is attached to the substrate 300 located in the lower part of FIG. 7a, the pressure sensors 450 and 460 may operate to detect the pressure as described with reference to FIG. 4c. For example, the pressure sensors 450 and 460 is disposed on the display module 200 side, and the reference potential layer may correspond to the surface of the substrate 300 and the elastic foam 440 may perform an action corresponding to the spacer layer 420. For instance, when the top of the touch input device 1000 is touched, the elastic foam 440 is pressed and then the distance between the substrate 300, i.e., the reference potential layer and the pressure sensors 450 and 460 is reduced. As a result, the mutual capacitance between the first pressure sensor 450 and the second pressure sensor 460 may be reduced. Through this capacitance change, the magnitude of the touch pressure can be detected.

Figure 7B:
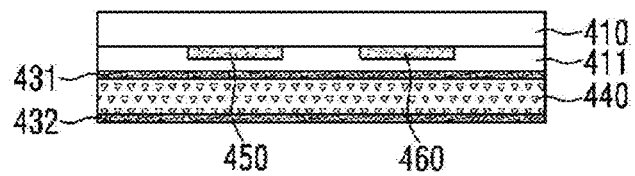

The pressure sensing unit of FIG. 7b is similar to the pressure sensing unit 400 shown in FIG. 7a. Hereafter, the following description will focus on the differences between them. Unlike FIG. 7a, the pressure sensing unit 400 is not attached to the substrate 300 by means of the adhesive layer 430 disposed on the outside of the elastic foam 440 in FIG. 7b. FIG. 7b may include a first adhesive layer 431 for adhering the elastic foam 440 to the second insulation layer 411, and a second adhesive layer 432 for adhering the pressure sensing unit 400 to the substrate 300. The second adhesive layer 432 is placed on the elastic foam 440. As such, the first and the second adhesive layers 431 and 432 are disposed, thereby securely attaching the elastic foam 440 to the second insulation layer 411 and thereby securely attaching the pressure sensing unit 400 to the substrate 300. According to the embodiment, the pressure sensing unit 400 shown in FIG. 7b may not include the second insulation layer 411. For example, the first adhesive layer 431 may not only functions as a cover layer which directly covers the pressure sensors 450 and 460, but also function to attach the elastic foam 440 to the first insulation layer 410 and the pressure sensors 450 and 460. This can be applied to the following FIGS. 7c to 7f.

Figure 7C:
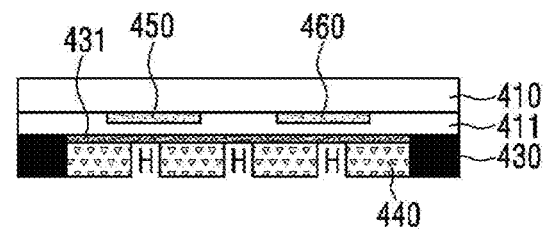
Figure 7D:
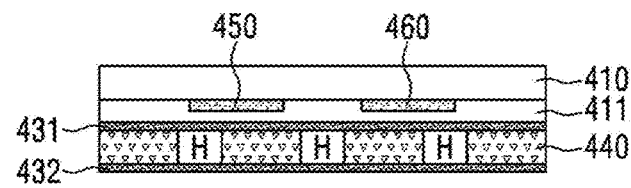

FIG. 7c shows a modified example of the structure shown in FIG. 7a. In FIG. 7c, the elastic foam 440 has a hole H formed therein to have a length as long as the height of the elastic foam 440, so that the elastic foam 440 can be well pressed when the touch input device 1000 is touched. The hole H may be filled with air. When the elastic foam 440 is well pressed, the pressure detection sensitivity may be improved. Also, the hole H formed in the elastic foam 440 makes it possible to prevent the surface of the elastic foam 440 from protruding due to the air at the time of attaching the pressure sensing unit 400 to the substrate 300, etc. In FIG. 7c, the first adhesive layer 431 as well as the adhesive layer 430 may be further included in order to securely adhere the elastic foam 440 to the second insulation layer 411. Here, the first adhesive layer 431 may be a double adhesive tape.

FIG. 7d shows a modified example of the structure shown in FIG. 7b. As with FIG. 7c, the elastic foam 440 has the hole H formed therein to have a length as long as the height of the elastic foam 440.

Figure 7E:
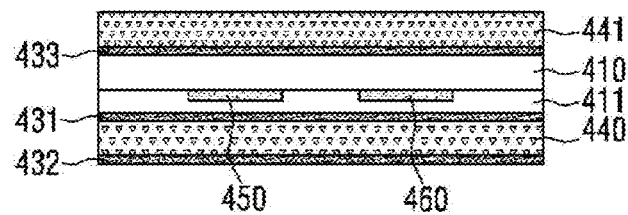

FIG. 7e shows a modified example of the structure shown in FIG. 7d. A second elastic foam 441 is further included on one side of the first insulation layer 410, that is, the opposite side to the elastic foam 440. The second elastic foam 441 may be further formed to minimize the impact transmitted to the display module 200 when the pressure sensing unit 400 is attached later to the touch input device 1000. Here, a third adhesive layer 433 may be further included in order to adhere the second elastic foam 441 to the first insulation layer 410.

Figure 7F:
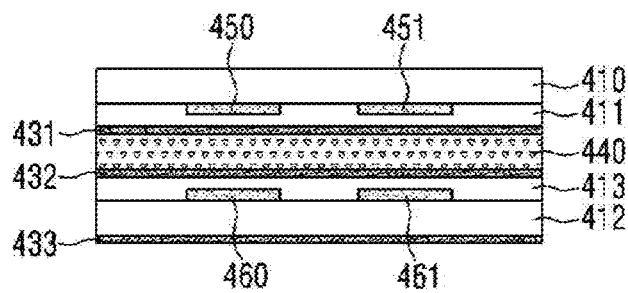

FIG. 7f shows the structure of the pressure sensing unit 400 capable of detecting the pressure as described with reference to FIG. 4d. FIG. 7f shows the structure of the pressure sensing unit 400 in which the first pressure sensors 450 and 451 and the second pressure sensors 460 and 461 are disposed with the elastic foam 440 placed therebetween. Similar to the structure described with reference to FIG. 7b, the first pressure sensors 450 and 451 are formed between the first insulation layer 410 and the second insulation layer 411, and the first adhesive layer 431, the elastic foam 440, and the second adhesive layer 432 may be formed. The second pressure sensors 460 and 461 are formed between a third insulation layer 412 and a fourth insulation layer 413, and the fourth insulation layer 413 may be attached to one side of the elastic foam 440 by means of the second adhesive layer 432. Here, the third adhesive layer 433 may be formed on the substrate-side surface of the third insulation layer 412, and the pressure sensing unit 400 may be attached to the substrate 300 by means of the third adhesive layer 433. As described with reference to FIG. 7b, according to the embodiment, the pressure sensing unit 400 shown in FIG. 7f may not include the second insulation layer 411 and/or the fourth insulation layer 413. For example, the first adhesive layer 431 may not only functions as a cover layer which directly covers the first pressure sensors 450 and 451, but also function to attach the elastic foam 440 to the first insulation layer 410 and the first pressure sensor 450 and 451. Also, the second adhesive layer 432 may not only functions as a cover layer which directly covers the second pressure sensors 460 and 461, but also function to attach the elastic foam 440 to the third insulation layer 412 and the second pressure sensors 460 and 461. Here, the first, second and third adhesive layers 431, 432, and 433 may be an adhesive tape.

Here, the elastic foam 440 is pressed by the touch on the touch input device 1000, and thus, the mutual capacitance between the first pressure sensors 450 and 451 and the second pressure sensors 460 and 461 may be increased. Through this capacitance change, the touch pressure can be detected. Also, according to the embodiment, any one of the first pressure sensor 450 and 451 and the second pressure sensor 460 and 461 is grounded, and thus, a magnetic capacitance can be detected by the other electrode.

In FIG. 7f, the thickness and manufacturing cost of the pressure sensing unit 400 become larger than those of a case where the electrode is formed in the form of a single layer. However, it is possible to ensure the pressure detection performance which is not changed by the characteristics of the reference potential layer located outside the pressure sensing unit 400. That is, the pressure sensing unit 400 is configured as shown in FIG. 7f, so that an effect due to an external potential (ground) environment can be minimized at the time of detecting the pressure. Therefore, the same pressure sensing unit 400 can be used regardless of the kind of the touch input device 1000 to which the pressure sensing unit 400 is applied.

Figure 8A:
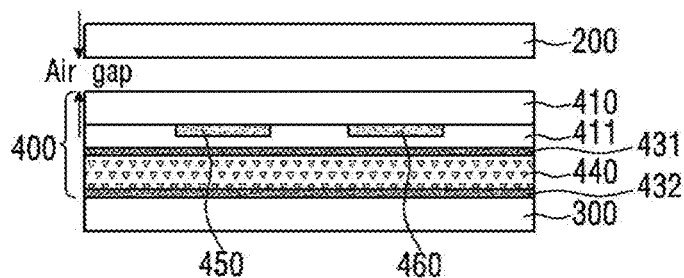
FIGS. 8a and 8b show that the pressure sensor according to the embodiment of the present invention is attached to a substrate opposite side to the display module.
Figure 8B:
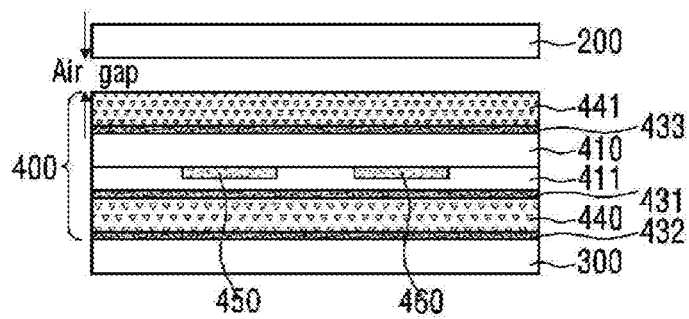

FIGS. 8a and 8b show that the pressure sensor according to the embodiment of the present invention is attached to the substrate opposite to the display module. FIG. 8a shows that the pressure sensing unit 400 having the structure shown in FIG. 7b is attached to the top surface of the substrate 300. FIG. 8b shows that the pressure sensing unit 400 having the structure shown in FIG. 7e is attached to the top surface of the substrate 300. Here, an air gap may be located between the pressure sensing unit 400 and the display module 200 in accordance with the manufacturing process of the touch input device 1000. Even though the air gap is pressed by the touch, the distance between the pressure sensors 450 and 460 and the substrate 300 is small, so that the pressure detection performance is not much affected.

FIG. 8a shows a case where the substrate 300 functions as a reference potential layer. According to the embodiment, the modified structures of FIGS. 7a to 7d can be attached to the substrate 300. Though FIG. 8a shows that, in the pressure sensing unit 400, the elastic foam 440 is formed relatively closer to the substrate 300 than the pressure sensors 450 and 460, the pressure sensing unit 400 in which the elastic foam 440 is formed relatively closer to the display module 200 than the pressure sensors 450 and 460 may be attached to the substrate 300. That is, the elastic foam 440 may be formed on the first insulation layer 410. In this case, the reference potential layer may be the display module 200.

Figure 9A:
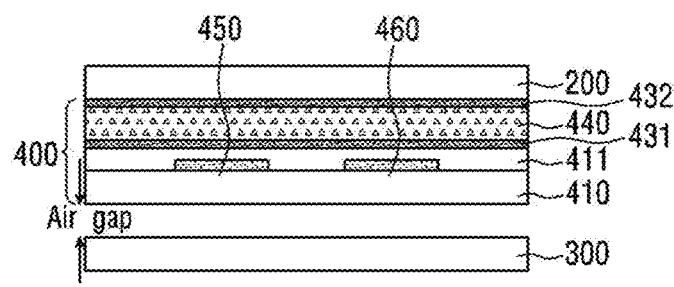
FIGS. 9a and 9b show that the pressure sensor according to the embodiment of the present invention is attached to the display module.
Figure 9B:
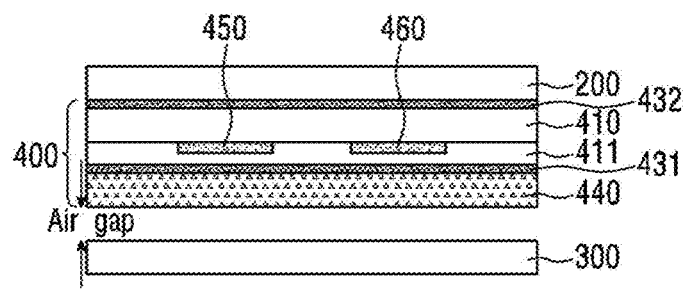

FIGS. 9a and 9b show that the pressure sensor according to the embodiment of the present invention is attached to the display module.

The pressure sensing unit 400 having the structure shown in FIGS. 7a to 7e may be turned upside down and be attached to the display module 200. FIG. 9a shows that the pressure sensing unit 400 having the structure shown in FIG. 7b is turned upside down and is attached to the display module 200. Here, the elastic foam 440 is pressed by the touch, so that the distance between the pressure sensors 450 and 460 and the display module 200, i.e., the reference potential layer is reduced. Thus, the mutual capacitance between the first pressure sensor 450 and the second pressure sensor 460 may be reduced. Through this capacitance change, the touch pressure can be detected.

According to the embodiment, the modified structure of the pressure sensing unit 400 can be used. FIG. 9b shows that the modified structure of the pressure sensing unit 400 shown in FIG. 7b is turned upside down and is attached to the display module 200. In FIG. 9b, the pressure sensing unit 400 may be configured such that the elastic foam 440 is located between the pressure sensors 450 and 460 and the substrate 300 instead of being located between the pressure sensors 450 and 460 and the display module 200. In this case, a reference potential layer for detecting the pressure may be the substrate 300. Therefore, the elastic foam 440 is pressed by the touch and the distance between the pressure sensors 450 and 460 and the substrate 300, i.e., the reference potential layer is reduced. As a result, the mutual capacitance between the first pressure sensor 450 and the second pressure sensor 460 may be reduced. Through this capacitance change, the touch pressure can be detected. In this case, the air gap which may be located between the substrate 300 and the pressure sensing unit 400 can be also used, together with the elastic foam 440, to induce the capacitance change caused by the touch.

The above-described pressure sensing unit 400 has been described by assuming that the touch occurs on the top surface of the display module. Besides, the pressure sensing unit 400 according to the embodiment can be modified to detect the touch pressure even when the pressure is applied to the bottom surface of the touch input device 1000.

As described above, in order to detect the pressure through the touch input device 1000 to which the pressure sensing unit 400 is applied according to the embodiment of the present invention, it is necessary to sense the change of the capacitance occurring at the pressure sensors 450 and 460. Therefore, it is necessary for the driving signal to be applied to the drive electrode out of the first and second pressure sensors 450 and 460, and it is required to detect the touch pressure by the capacitance change amount by obtaining the sensing signal from the receiving electrode. According to the embodiment, it is possible to additionally include a pressure detection device in the form of a pressure sensing IC for the operation of the pressure detection. The pressure sensing unit 400 according to the embodiment of the present invention may include not only the structure shown in FIG. 7, etc., including the pressure sensors 450 and 460 for pressure detection but also the pressure detection device.

In this case, the touch input device repeatedly has a configuration similar to the configuration of FIG. 1 including the driving unit 120, sensing unit 110, and controller 130, so that the area and volume of the touch input device 1000 increase.

According to the embodiment, the touch detection device 1000 may apply the driving signal for pressure detection to the pressure sensors 450 and 460 by using the touch detection device for the operation of the touch sensor panel 100, and may detect the touch pressure by receiving the sensing signal from the pressure sensors 450 and 460. Hereafter, the following description will be provided by assuming that the first pressure sensor 450 is the drive electrode and the second pressure sensor 460 is the receiving electrode.

For this, in the touch input device 1000 to which the pressure sensing unit 400 is applied according to the embodiment of the present invention, the driving signal may be applied to the first pressure sensor 450 from the driving unit 120, and the second pressure sensor 460 may transmit the sensing signal to the sensing unit 110. The controller 130 may perform the scanning of the touch sensor panel 100, and simultaneously perform the scanning of the touch pressure detection, or the controller 130 performs the time-sharing, and then may generate a control signal such that the scanning of the touch sensor panel 100 is performed in a first time interval and the scanning of the pressure detection is performed in a second time interval different from the first time interval.

Therefore, in the embodiment of the present invention, the first pressure sensor 450 and the second pressure sensor 460 should be electrically connected to the driving unit 120 and/or the sensing unit 110. Here, it is common that the touch detection device for the touch sensor panel 100 corresponds to the touch sensing IC 150 and is formed on one end of the touch sensor panel 100 or on the same plane with the touch sensor panel 100. The pressure sensors 450 and 460 included in the pressure sensing unit 400 may be electrically connected to the touch detection device of the touch sensor panel 100 by any method. For example, the pressure sensors 450 and 460 may be connected to the touch detection device through a connector by using the second PCB 210 included in the display module 200.

Figure 10A:
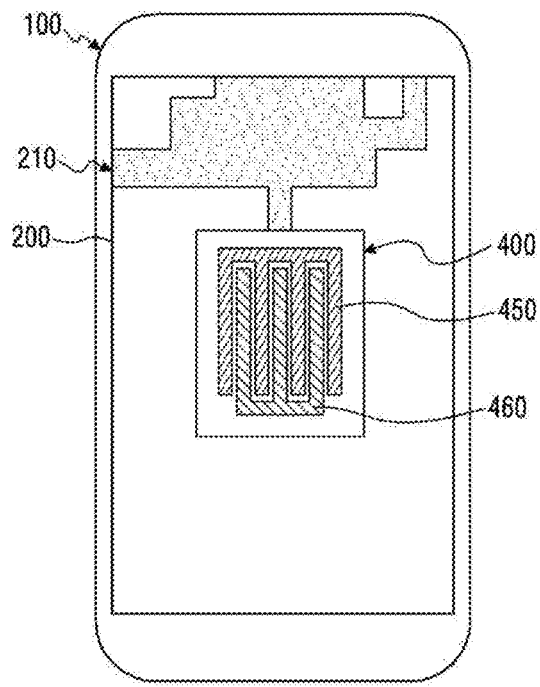
FIGS. 10a and 10b show an attachment method of the pressure sensor according to the embodiment of the present invention.
Figure 10B:
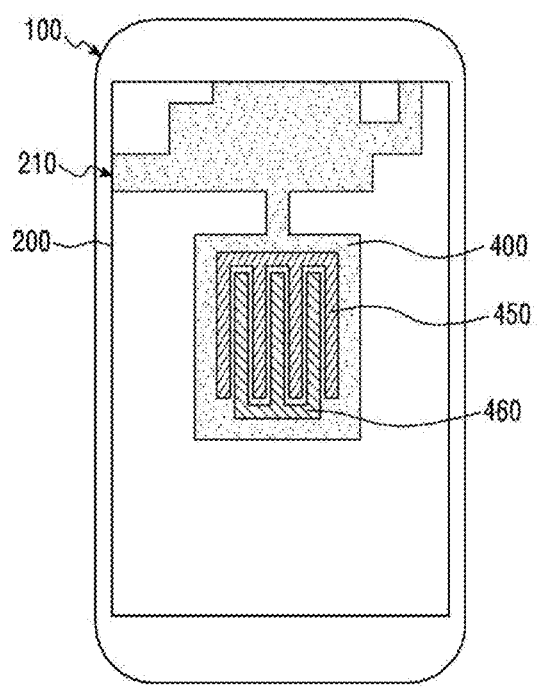

FIGS. 10a to 10b show that the pressure sensing unit 400 including the pressure sensors 450 and 460 is attached to the bottom surface of the display module 200. FIGS. 10a and 10b show the second PCB 210 on which a circuit for the operation of the display panel has been mounted is disposed on a portion of the bottom surface of the display module 200.

FIG. 10a shows that the pressure sensing unit 400 is attached to the bottom surface of the display module 200 such that the first pressure sensor 450 and the second pressure sensor 460 are connected to one end of the second PCB 210 of the display module 200. A conductive pattern may be printed on the second PCB 210 in such a manner as to electrically connect the pressure sensors 450 and 460 to a necessary component like the touch sensing IC 150, etc.

Figure 11A:
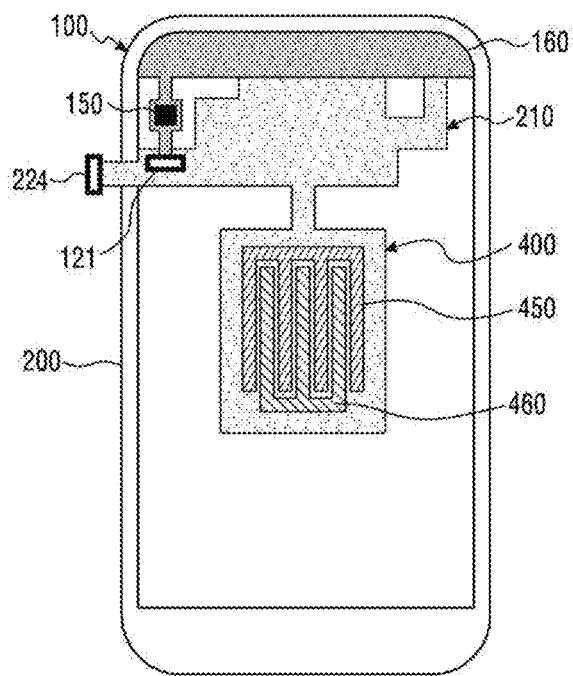
FIGS. 11a to 11c show how the pressure sensor according to the embodiment of the present invention is connected to a touch sensing circuit.
Figure 11B:
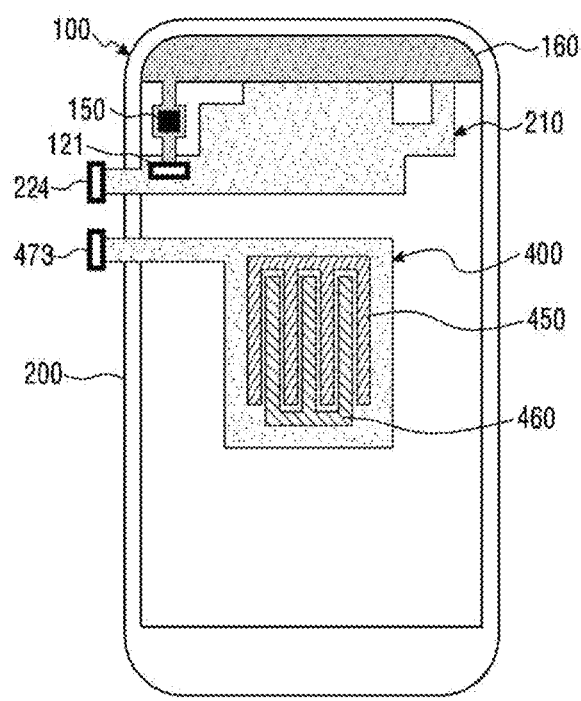
Figure 11C:
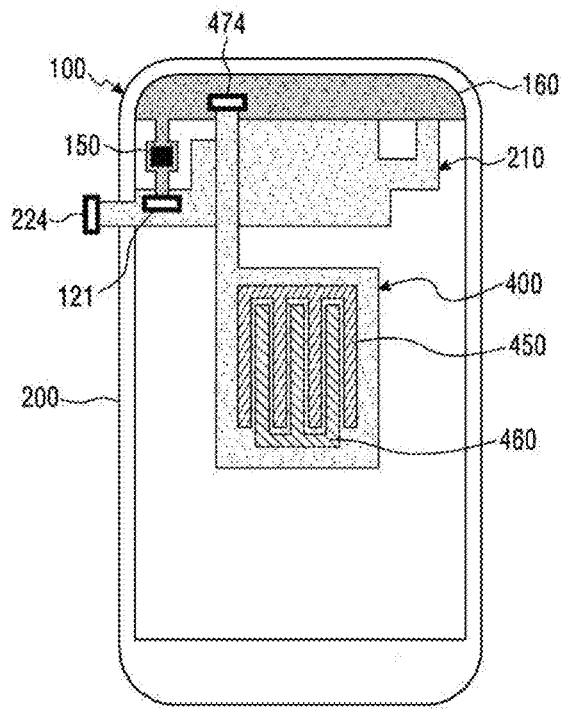

The detailed description of this will be provided with reference to FIGS. 11a to 11c. An attachment method of the pressure sensing unit 400 including the pressure sensors 450 and 460 shown in FIG. 10a can be applied in the same manner to the substrate 300.

FIG. 10b shows that the pressure sensing unit 400 including the first and the second pressure sensors 450 and 460 is integrally formed on the second PCB 210 of the display module 200. For example, when the second PCB 210 of the display module 200 is manufactured, a certain area is separated from the second PCB, and then not only the circuit for the operation of the display panel but also the pattern corresponding to the first pressure sensor 450 and the second pressure sensor 460 can be printed on the area. A conductive pattern may be printed on the second PCB 210 in such a manner as to electrically connect the first pressure sensor 450 and the second pressure sensor 460 to a necessary component like the touch sensing IC 150, etc.

FIGS. 11a to 11c show a method for connecting the pressure sensors 450 and 460 to the touch sensing IC 150. In FIGS. 11a to 11c, the touch sensor panel 100 is included outside the display module 200. FIGS. 11a to 11c show that the touch detection device of the touch sensor panel 100 is integrated in the touch sensing IC 150 mounted on the first PCB 160 for the touch sensor panel 100.

FIG. 11a shows that the pressure sensors 450 and 460 attached to the display module 200 are connected to the touch sensing IC 150 through a first connector 121. As shown in FIG. 11a, in a mobile communication device such as a smart phone, the touch sensing IC 150 is connected to the second PCB 210 for the display module 200 through the first connector 121. The second PCB 210 may be electrically connected to the main board through a second connector 224. Therefore, through the first connector 121 and the second connector 224, the touch sensing IC 150 may transmit and receive a signal to and from the CPU or AP for the operation of the touch input device 1000.

Here, while FIG. 11a shows that the pressure sensing unit 400 is attached to the display module 200 by the method shown in FIG. 10b, the pressure sensing unit 400 can be attached to the display module 200 by the method shown in FIG. 10a. A conductive pattern may be printed on the second PCB 210 in such a manner as to electrically connect the first pressure sensor 450 and the second pressure sensor 460 to the touch sensing IC 150 through the first connector 121.

FIG. 11b shows that the pressure sensors 450 and 460 attached to the display module 200 are connected to the touch sensing IC 150 through a third connector 473. In FIG. 11b, the pressure sensors 450 and 460 may be connected to the main board for the operation of the touch input device 1000 through the third connector 473, and in the future, may be connected to the touch sensing IC 150 through the second connector 224 and the first connector 121. Here, the pressure sensors 450 and 460 may be printed on an additional PCB separated from the second PCB 210. Otherwise, according to the embodiment, the pressure sensors 450 and 460 may be attached to the touch input device 1000 in the structure shown in FIG. 7 and may be connected to the main board through the connector 473 by extending the conductive trace, etc., from the pressure sensors 450 and 460.

Even when the pressure electrodes 450 and 460 are printed on the second PCB 210 or on the additional PCB separated from the second PCB, the pressure electrodes 450 and 460 and a portion of the PCB in which the pressure electrodes 450 and 460 have been printed may be collectively referred to as the pressure sensing unit 400.

FIG. 11c shows that the pressure sensors 450 and 460 are directly connected to the touch sensing IC 150 through a fourth connector 474. In FIG. 11c, the pressure sensors 450 and 460 may be connected to the first PCB 160 through the fourth connector 474. A conductive pattern may be printed on the first PCB 160 in such a manner as to electrically connect the fourth connector 474 to the touch sensing IC 150. As a result, the pressure sensors 450 and 460 may be connected to the touch sensing IC 150 through the fourth connector 474. Here, the pressure sensors 450 and 460 may be printed on the additional PCB separated from the second PCB 210. The second PCB 210 may be insulated from the additional PCB so as not to be short-circuited with each other. Also, according to the embodiment, the pressure sensors 450 and 460 may be attached to the touch input device 1000 in the structure shown in FIG. 7 and may be connected to the first PCB 160 through the connector 474 by extending the conductive trace, etc., from the pressure sensors 450 and 460. Unlike FIG. 11c, the fourth connector 474 may be directly connected to the second PCB 210.

The connection method of FIGS. 11b and 11c can be applied to the case where the pressure sensors 450 and 460 are formed on the substrate 300 as well as on the bottom surface of the display module 200.

FIGS. 11a to 11c have been described by assuming that a chip on board (COB) structure in which the touch sensing IC 150 is formed on the first PCB 160. However, this is just an example. The present invention can be applied to the chip on board (COB) structure in which the touch sensing IC 150 is mounted on the main board within the mounting space 310 of the touch input device 1000. It will be apparent to those skilled in the art from the descriptions of FIGS. 11a to 11c that the connection of the pressure sensors 450 and 460 through the connector can be also applied to another embodiment.

The foregoing has described the pressure sensors 450 and 460, that is to say, has described that the first pressure sensor 450 constitutes one channel as the drive electrode and the second pressure sensor 460 constitutes one channel as the receiving electrode. However, this is just an example. According to the embodiment, the drive electrode and the receiving electrode constitute a plurality of channels respectively, so that it is possible to detect a pressure of each of multi touch.

Figure 12A:
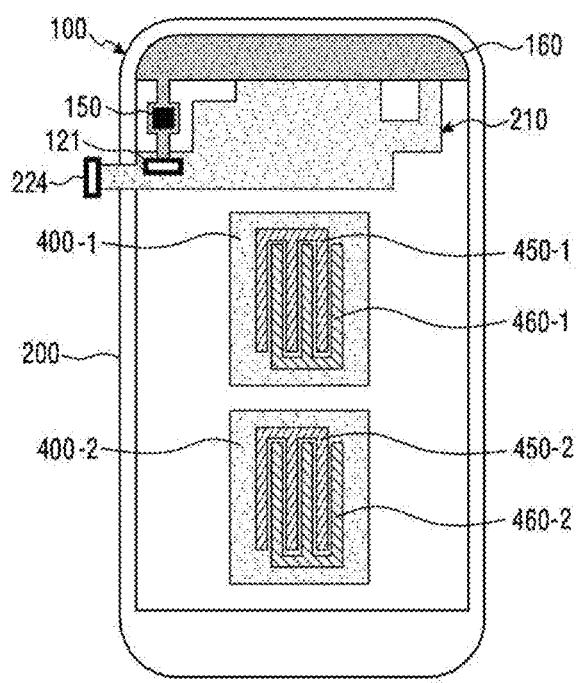
FIGS. 12a to 12c show that the pressure sensor according to the embodiment of the present invention includes a plurality of channels.
Figure 12B:
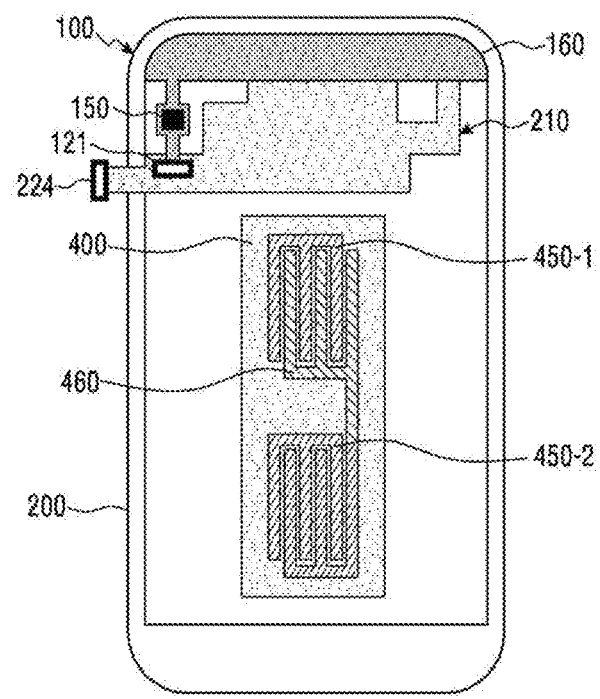
Figure 12C:
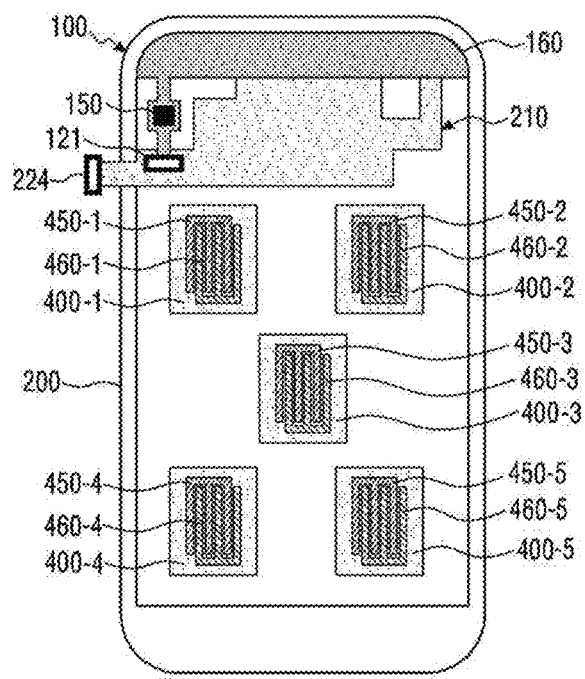

FIGS. 12a to 12c show that the pressure sensor of the present invention constitutes the plurality of channels. FIG. 12a shows first pressure sensors 450-1 and 450-2 and second pressure sensors 460-1 and 460-2 constitute two channels respectively. FIG. 12a shows that the first pressure sensor 450-1 and the second pressure sensor 460-1 which constitute a first channel are included in a first pressure sensing unit 400-1, and the first pressure sensor 450-2 and the second pressure sensor 460-2 which constitute a second channel are included in a second pressure sensing unit 400-2. However, all of the first pressure sensors 450-1 and 450-2 and the second pressure sensors 460-1 and 460-2 which constitute the two channels may be included in one pressure sensing unit 400. FIG. 12b shows that the first pressure sensor 450 constitutes two channels 450-1 and 450-2 and the second pressure sensor 460 constitutes one channel. FIG. 12c shows the first pressure sensors 450-1 to 450-5 constitute five channels and the second pressure sensors 460-1 to 460-5 constitute five channels. Even in this case, all of the electrodes constituting the five channels may be also included in one pressure sensing unit 400.

FIGS. 12a to 12c show that the pressure sensor constitutes a single or a plurality of channels. The pressure sensor may be comprised of a single or a plurality of channels by a variety of methods. While FIGS. 12a to 12c do not show that the pressure sensors 450 and 460 are electrically connected to the touch sensing IC 150, the pressure sensors 450 and 460 can be connected to the touch sensing IC 150 by the method shown in FIGS. 11a to 11c and other methods.

As described above, by applying the pressure sensing unit 400 according to the embodiment of the present invention to the existing touch input device 1000 including the touch sensor panel detecting whether or not the touch has occurred and where the touch has occurred, the touch pressure can be easily detected through the corresponding touch input device 1000. After the existing touch input device 1000 is minimally changed, the pressure sensing unit 400 according to the embodiment of the present invention is disposed. As a result, it is possible to detect the touch pressure by using the existing touch input device 1000.

Figure 13A:
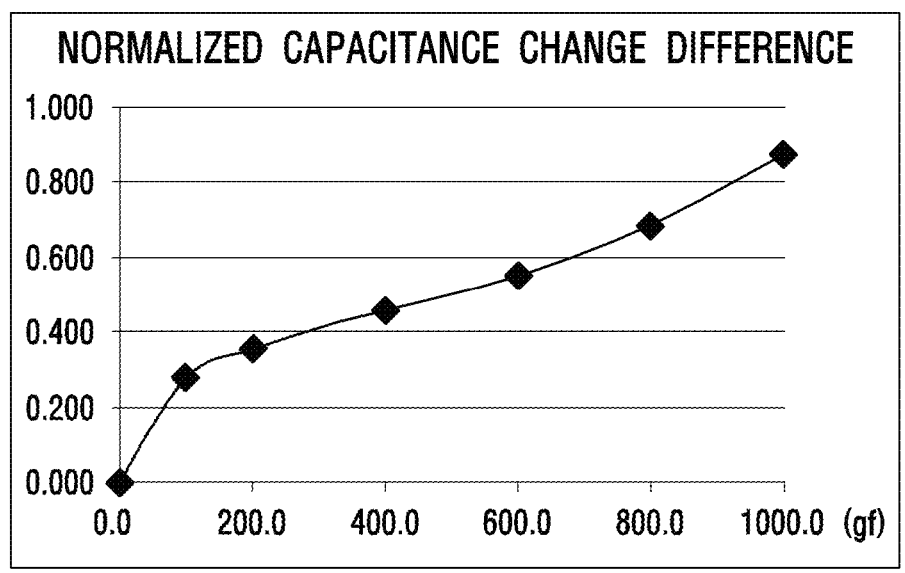
FIG. 13a is a graph showing a capacitance change difference normalized in accordance with a pressure touch weight on the touch input device including the pressure sensor according to the embodiment of the present invention.
Figure 13B:
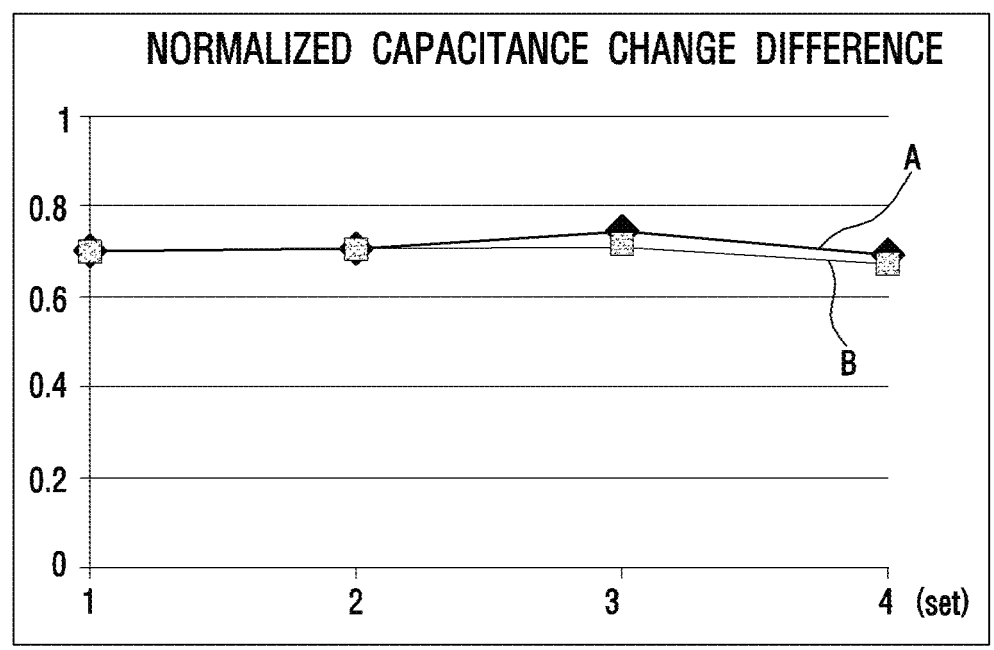
FIG. 13b is a graph showing a capacitance change difference normalized in accordance with the pressure touch before and after a predetermined number of pressure touches on the touch input device including the pressure sensor according to the embodiment of the present invention and deviations between before and after the pressure touches.
Figure 13B:
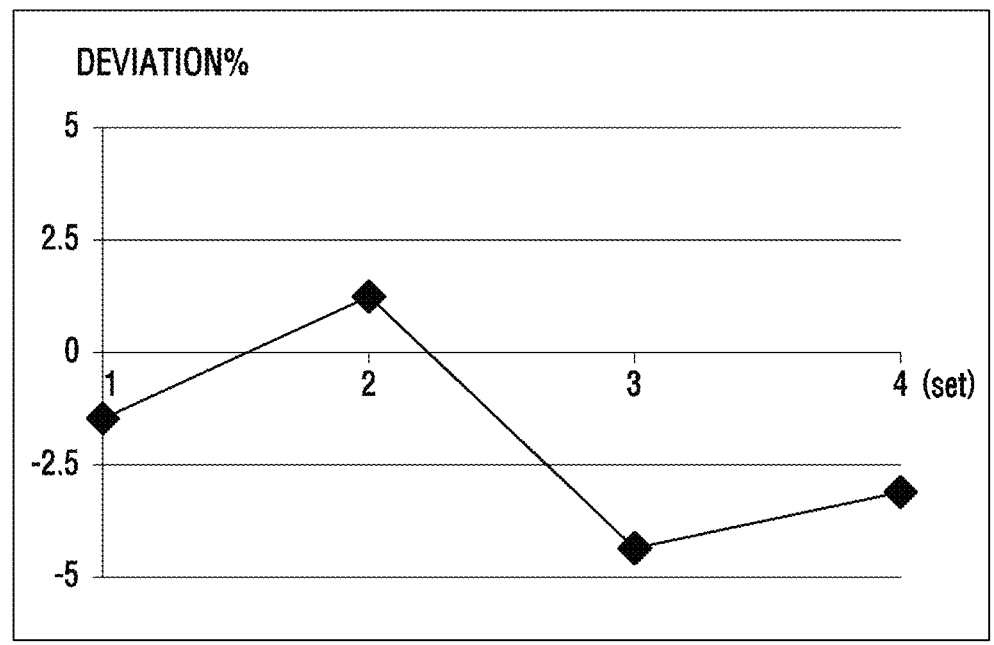
Figure 13C:
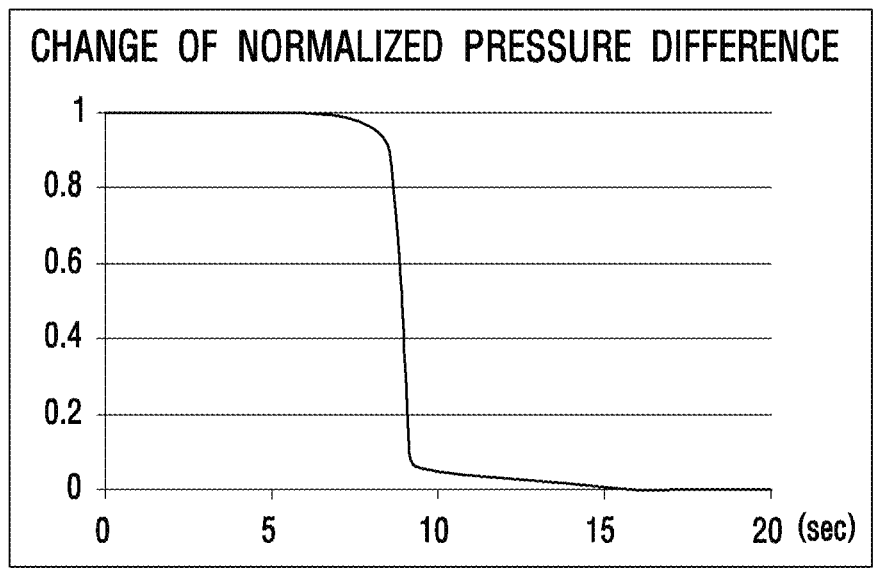
FIG. 13c is a graph showing a change of a normalized pressure difference which is detected after releasing the pressure applied to the touch input device including the pressure sensor according to the embodiment of the present invention.

Experiments of FIGS. 13a to 13c are performed for the touch input device 1000 having the structure shown in FIG. 8a. In the following experiments, the elastic foam 440 included in the pressure sensing unit 400 is manufactured, including polypropylene.

FIG. 13a is a graph showing capacitance change differences normalized in accordance with the weight of a pressure touch on the touch input device including the pressure sensor according to the embodiment of the present invention. FIG. 13a is a graph showing normalized differences of the change of the capacitance generated between the first pressure sensor 450 and the second pressure sensor 460, which is calculated by the pressure detection device when the touch surface of the touch input device 1000 is touched with a pressure of 0 gf (gram force), 100 gf, . . . , 1000 gf. Here, the capacitance change difference means that a change difference between a case where the touch input device 1000 is touched with 0 gf and a case where the touch input device 1000 is touched with a gram force of a corresponding weight. Even though the capacitance change difference is not changed in direct proportion to the magnitude of the weight of the touch on the touch input device 1000, the capacitance change difference is changed in a monotonically increasing form, so that it is possible to detect the magnitude of the pressure at the time of touching the touch input device 1000 according to the embodiment of the present invention.

FIG. 13b is a graph which shows capacitance change differences normalized in accordance with the pressure touch before and after a predetermined number of the pressure touches occur on the touch input device including the pressure sensor according to the embodiment of the present invention, and shows deviations between the capacitance changes. The experiment of FIG. 13b is performed on four sets of the touch input devices 1000 respectively. In the upper graph of FIG. 13b, "A" and "B" represent before and after the touch input device 1000 according to the embodiment of the present invention is touched hundred thousand times with a pressure of 800 gf. Each of "A" and "B" represents a value obtained by normalizing differences of the change of the capacitance generated between the first pressure sensor 450 and the second pressure sensor 460, which is calculated by the pressure detection device when the touch surface of the touch input device 1000 is touched with a pressure of 800 gf. It can be seen that though the difference values of the change of the capacitance generated before "A" and after "B" the touch occurs hundred thousand times are not the same, the deviations of the difference values are very small.

The lower graph of FIG. 13b shows deviations between the difference values of the change of the capacitance of "A" and "B". It can be found that the deviations between the difference values of the change of the capacitance generated before and after the touch input device 1000 according to the embodiment of the present invention is touched hundred thousand times is less than 5%. Through FIG. 13b, it can be understood that even when the pressure sensing unit 400 using the elastic foam according to the embodiment is used for a long time, the pressure detection performance can be uniformly maintained.

FIG. 13c is a graph showing a normalized pressure difference change which is detected by releasing the touch applied to the touch input device including the pressure sensor according to the embodiment of the present invention. In FIG. 13c, when the touch surface of the touch input device 1000 is touched with a pressure of 800 gf, the magnitude of the pressure calculated by the pressure detection device is represented by 1 and the magnitude change of the pressure calculated after the applied pressure is released is shown. Referring to FIG. 13c, it can be appreciated that a time required for the pressure difference to reach from 90% of 1, i.e., the maximum pressure magnitude, to 10% after the applied pressure is released is approximately 0.7 seconds. As such, since the elastic foam has a high restoring force after the pressure touch is released, when the pressure sensing unit 400 including the elastic foam according to the embodiment of the present invention is used, it is possible to prevent that a pressure detection accuracy is reduced by consecutive pressure touches. Here, a required restoring speed may be changed according to the embodiment. According to the embodiment, the time required for the pressure difference to reach from 90% of 1, i.e., the maximum pressure magnitude, to 10% may be less than 1 second.

Figure 15A:
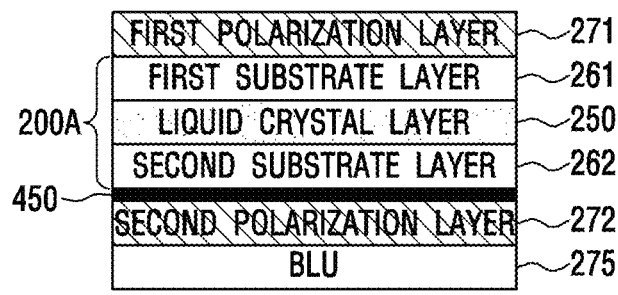
FIGS. 15a to 15b are cross sectional views showing an embodiment of a strain gauge directly formed on various display panels on the touch input device according to the embodiment of the present invention.
Figure 15B:
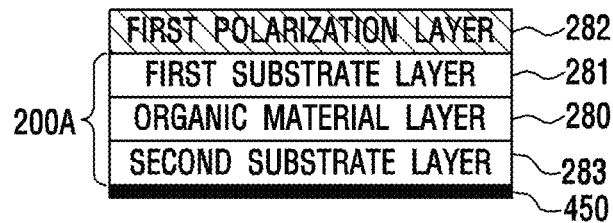

Meanwhile, in the touch input device 1000 according to the embodiment of the present invention, a strain gauge 450 may be directly formed on the display panel 200A. FIGS. 15a to 15c are cross sectional views showing an embodiment of the strain gauge formed directly on various display panel of the touch input device according to the embodiment of the present invention.

First, FIG. 15a shows the strain gauge 450 formed on the display panel 200A using the LCD panel. Specifically, as shown in FIG. 15a, the strain gauge 450 may be formed on the bottom surface of the second substrate layer 262. Here, the strain gauge 450 may be formed on the bottom surface of the second polarization layer 272. Next, FIG. 15b shows the strain gauge 450 formed on the bottom surface of the display panel 200A using the OLED panel (in particular, AM-OLED panel). Specifically, the strain gauge 450 may be formed on the bottom surface of the second substrate layer 283.

In the case of the OLED panel, since the organic material layer 280 emits light, the strain gauge 450 which are formed on the bottom surface of the second substrate layer 283 disposed under the organic material layer 280 may be made of an opaque material. However, in this case, a pattern of the strain gauge 450 formed on the bottom surface of the display panel 200A may be visible to the user. Therefore, for the purpose of directly forming the strain gauge 450 on the bottom surface of the second substrate layer 283, a light shielding layer like black ink is applied on the bottom surface of the second substrate layer 283, and then the strain gauge 450 may be formed on the light shielding layer. Also, FIG. 15b shows that the strain gauge 450 is formed on the bottom surface of the second substrate layer 283. However, a third substrate layer (not shown) may be disposed under the second substrate layer 283, and the strain gauge 450 may be formed on the bottom surface of the third substrate layer.

In particular, when the display panel 200A is a flexible OLED panel, the third substrate layer which is not relatively easily bent may be disposed under the second substrate layer 283 because the display panel 200A composed of the first substrate layer 281, the organic material layer 280, and the second substrate layer 283 is very thin and easily bent.

FIGS. 16a to 16d show an example in which the strain gauge is applied to the touch input device according to the embodiment of the present invention.

In the touch input device 1000 according to the embodiment of the present invention, by means of an adhesive like an optically clear adhesive (OCA), lamination may occur between the cover layer 100 on which the touch sensor for detecting the touch position has been formed and the display module 200 including the display panel 200A. As a result, the display color clarity, visibility and optical transmittance of the display module 200, which can be recognized through the touch surface of the touch sensor, can be improved.

Figure 16A:
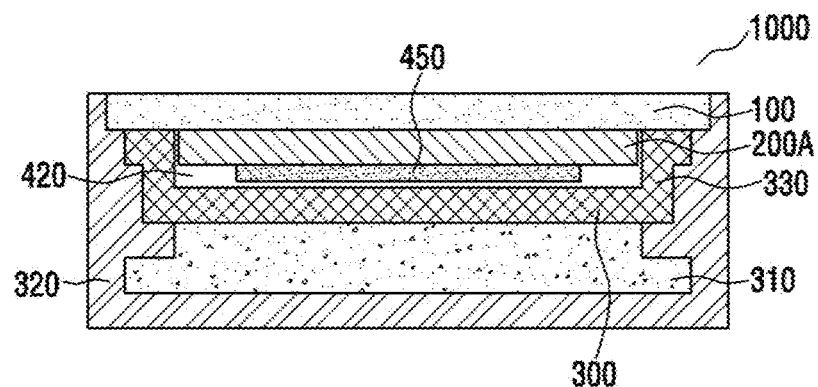
FIGS. 16a to 16d show an example in which the strain gauge is applied to the touch input device according to the embodiment of the present invention.

In FIG. 16a and some of the following figures, it is shown that the display panel 200A is directly laminated on and attached to the cover layer 100. However, this is only for convenience of description. The display module 200 where the first polarization layers 271 and 282 is located on the display panel 200A may be laminated on and attached to the cover layer 100. When the LCD panel is the display panel 200A, the second polarization layer 272 and the backlight unit are omitted.

Figure 16B:
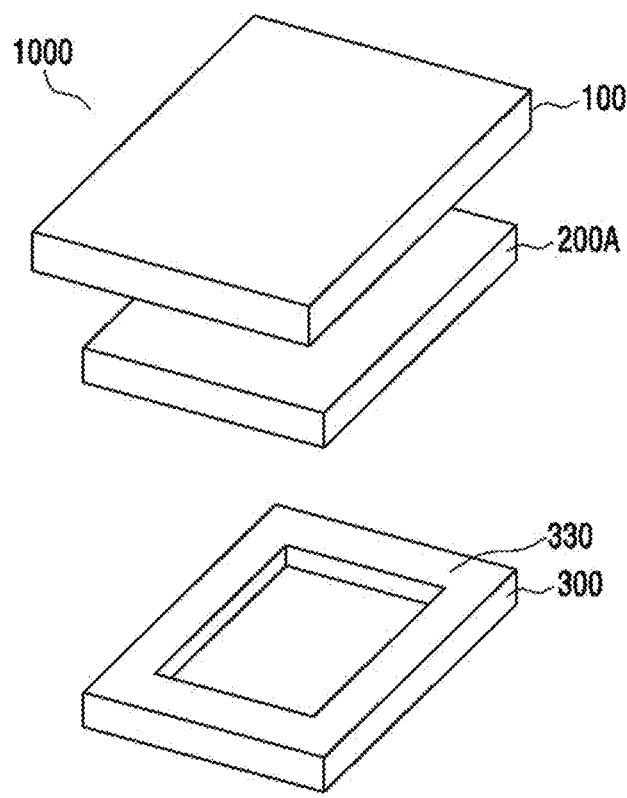

In the description with reference to FIGS. 16a to 16d, it is shown that as the touch input device 1000 according to the embodiment of the present invention, the cover layer 100 in which the touch sensor has been formed is laminated on and attached to the display module 200 shown in FIGS. 3a and 3b by means of an adhesive. However, the touch input device 1000 according to the embodiment of the present invention may include that the touch sensor 10 is disposed inside the display module 200 shown in FIGS. 3a and 3b. More specifically, while FIGS. 16a and 16b show that the cover layer 100 where the touch sensor has been formed covers the display module 200 including the display panel 200A, the touch input device 1000 which includes the touch sensor 10 disposed inside the display module 200 and includes the display module 200 covered with the cover layer 100 like glass may be used as the embodiment of the present invention.

The touch input device 1000 according to the embodiment of the present invention may include an electronic device including the touch screen, for example, a cell phone, a personal data assistant (PDA), a smart phone, a tablet personal computer, an MP3 player, a laptop computer, etc.

In the touch input device 1000 according to the embodiment of the present invention, the substrate 300, together with the outermost housing 320 of the touch input device 1000, may function to surround the mounting space 310, etc., where the circuit board and/or battery for operation of the touch input device 1000 are placed. Here, the circuit board for operation of the touch input device 1000 may be a main board. A central processing unit (CPU), an application processor (AP) or the like may be mounted on the circuit board. Due to the substrate 300, the display module 200 is separated from the circuit board and/or battery for operation of the touch input device 1000. Due to the substrate 300, electrical noise generated from the display module 200 and noise generated from the circuit board can be blocked.

The touch sensor 10 or the cover layer 100 of the touch input device 1000 may be formed wider than the display module 200, the substrate 300, and the mounting space 310.

As a result, the housing 320 may be formed such that the housing 320, together with the touch sensor 10, surrounds the display module 200, the substrate 300, and the circuit board.

Hereafter, for the purpose of clearly distinguishing between the force sensor 450 and the electrode included in the touch sensor 10, the pressure sensor 450 for detecting the pressure or force may be the strain gauge 450.

The touch input device 1000 according to the embodiment of the present invention may detect the touch position through the touch sensor 10, and the touch pressure (or force) can be detected by the strain gauge 450 formed on the display module 200. Here, the touch sensor 10 may be disposed inside or outside the display module 200.

The touch input device 1000 according to the embodiment of the present invention may be formed to further include a spacer layer 420 composed of an air gap. Here, according to the embodiment, the spacer layer 420 may be made of an impact absorbing material. According to the embodiment, the spacer layer 420 may be filled with a dielectric material.

Here, since the strain gauge 450 is disposed in the rear side instead of in the front side of the display panel 200A, the strain gauge 450 may be made of an opaque material as well as a transparent material. When the display panel 200A is the LCD panel, the light from the backlight unit must transmit through the strain gauge 450. Therefore, the strain gauge 450 may be made of a transparent material such as ITO.

Here, the frame 330 having a predetermined height may be formed along the border of the upper portion of the substrate 300 in order to maintain the spacer layer 420. Here, the frame 330 may be bonded to the cover layer 100 by means of an adhesive layer (not shown). Here, the adhesive layer may be an adhesive tape. While FIG. 5b shows the frame 330 is formed on the entire border (e.g., four sides of the quadrangle) of the substrate 300, the frame 330 may be formed only on at least some (e.g., three sides of the quadrangle) of the border of the substrate 300. According to the embodiment, the frame 330 may be formed on the top surface of the substrate 300 may be integrally formed with the substrate 300 on the top surface of the substrate 300. In the embodiment of the present invention, the frame 330 may be made of an inelastic material. In the embodiment of the present invention, when a pressure (or force) is applied to the display panel 200A through the cover layer 100, the display panel 200A, together with the cover layer 100, may be bent. Therefore, the magnitude of the touch pressure (or force) can be detected even though the frame 330 is not deformed by the pressure (or force).

Figure 16C:
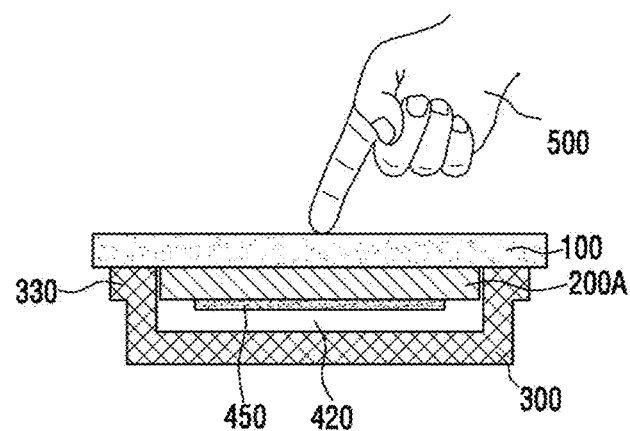

FIG. 16c is a cross sectional view of the touch input device including the strain gauge according to the embodiment of the present invention. As shown in FIG. 16c, the strain gauge 450 according to the embodiment of the present invention may be formed on the bottom surface of the display panel 200A.

Figure 16D:
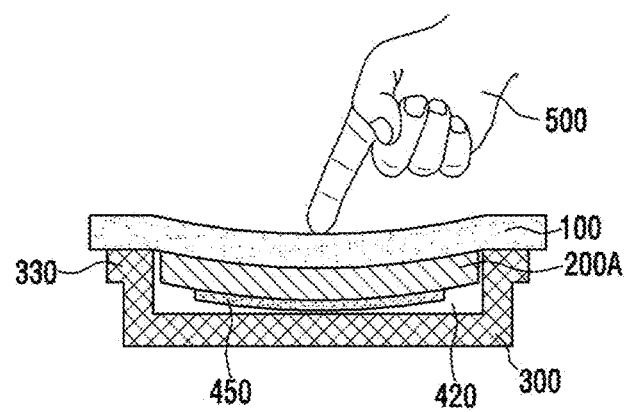

FIG. 16d is a cross sectional view when a pressure (or force) is applied to the touch input device 1000 shown in FIG. 16c. The top surface of the substrate 300 may have a ground potential so as to block the noise. When a pressure (or force) is applied to the surface of the cover layer 100 by an object 500, the cover layer 100 and the display panel 200A may be bent or pressed. Due to the bending of the display panel 200A, the strain gauge 450 formed on the display panel 200A is deformed. Accordingly, the resistance value of the strain gauge 450 may be changed. The magnitude of the touch pressure (or force) can be calculated by the change of the resistance value.

In the touch input device 1000 according to the embodiment of the present invention, the display panel 200A may be bent or pressed by the touch applying the pressure (or force). The display panel 200A may be bent or pressed to show deformation by the touch. When the display panel 200A is bent or pressed according to the embodiment, a position showing the biggest deformation may not match the touch position. However, the display panel 200A may be shown to be bent at least at the touch position. For example, when the touch position approaches close to the border, edge, etc., of the display panel 200A, the most bent or pressed position of the display panel 200A may not match the touch position, however, the display panel 200A may be shown to be bent or pressed at least at the touch position.

FIGS. 17a and 17d to 17f are plan views showing an exemplary pressure (or force) sensor capable of sensing a pressure (or force) used in the touch input device according to the embodiment of the present invention. In this case, the pressure (or force) sensor may be the strain gauge. The electrical resistance of the strain gauge is changed in proportional to the amount of strain. Typically, a metal-bonded strain gauge may be used.

A transparent material used for the strain gauge may include conductive polymer (polyethylenedioxythiophene (PEDOT)), indium tin oxide (ITO), Antimony tin oxide (ATO), carbon nanotubes (CNT), graphene, gallium zinc oxide, indium gallium zinc oxide (IGZO), SnO2, In2O3, ZnO, Ga2O3, CdO, other doped metal oxides, piezoresistive element, piezoresistive semiconductor materials, piezoresistive metal material, silver nanowire, platinum nanowire, nickel nanowire, other metallic nanowires, etc. An opaque material used for the strain gauge may include silver ink, copper, nano silver, carbon nanotube (CNT), Constantan alloy, Karma alloys, doped polycrystalline silicon, doped amorphous silicon, doped single crystal silicon, other doped semiconductor materials, etc.

Figure 17A:
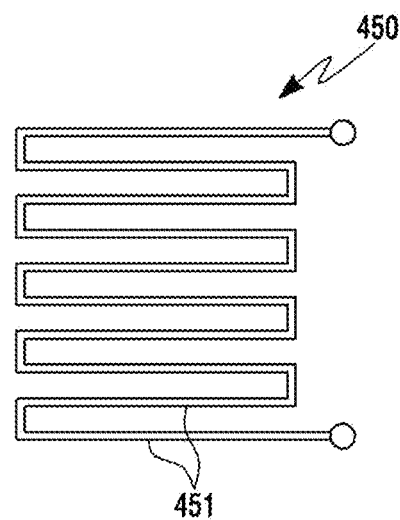
FIGS. 17a and 17d to 17f are plan views showing an exemplary pressure sensor (or force sensor) capable of sensing a pressure used in the touch input device according to the embodiment of the present invention.

As shown in FIG. 17a, the metal strain gauge may be composed of metal foils arranged in a grid-like manner. Through the grid-like manner, it is possible to maximize the deformation amount of a metal wire or foil which tends to be deformed in a parallel direction. Here, the vertical grid cross section of the strain gauge 450 shown in FIG. 17a may be minimized in order to reduce the effects of shear strain and Poisson strain.

In FIG. 17a, while the strain gauge 450 is at rest, that is to say, is not strained or deformed, the strain gauge 450 may include traces 451 which are disposed close to each other without contacting each other. The strain gauge may have a normal resistance such as 1.8 KΩ±0.1% when no strain or no force are applied. A sensitivity for the strain may be represented as a basic parameter of the strain gauge by a gauge factor (GF). Here, the gauge factor may be defined as a ratio of the change of the electrical resistance to the change of the length (strain) and may be represented as follows by a function of a strain ε.

$$GF = \frac{\Delta R/R}{\Delta L/L} = \frac{\Delta R/R}{\varepsilon}$$

Here, ΔR represents the change amount of the strain gauge resistance, R represents a resistance of an undeformed strain gauge, and GF represents the gauge factor.

Here, in most cases, in order to measure the small change of the resistance, the strain gauge is used to establish a bridge including a voltage drive source.

Figure 17B:
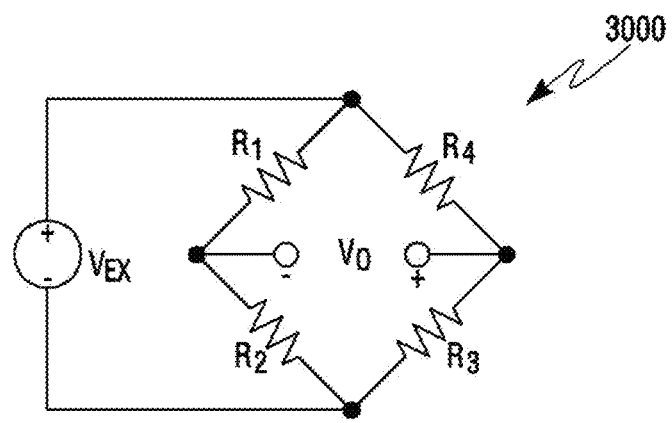
FIGS. 17b and 17c show an exemplary strain gauge which can be applied to the touch input device according to the embodiment of the present invention.
Figure 17C:
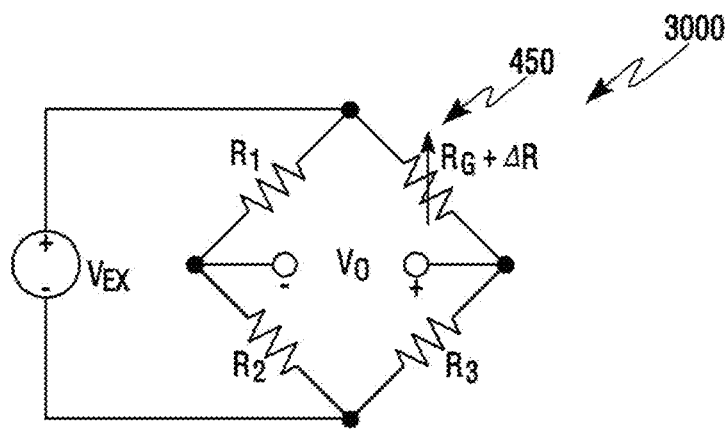

FIGS. 17b and 17c show an exemplary strain gauge which can be applied to the touch input device according to the embodiment of the present invention. As shown in the example of FIG. 17b, the strain gauge is included in a Wheatstone bridge 3000 having four different resistances (represented as R1, R2, R3, and R4) and may detect the resistance change (to other resistors) of the gauge, which represents the applied force. The bridge 3000 is coupled to a force sensor interface (not shown) and receives the drive signal (voltage VEX) from a touch controller (not shown) and then drives the strain gauge, and, for the signal process, transmits the sensing signal (voltage Vo) representing the applied force to the touch controller. Here, the output voltage (Vo) of the bridge 3000 may be represented as follows.

$$V_O = \left[\frac{R_3}{R_3 + R_4} - \frac{R_2}{R_1 + R_2}\right] \cdot V_{EX}$$

In the above equation, when R1/R2=R4/R3, the output voltage Vo becomes 0. Under this condition, the bridge 3000 is in a balanced state. Here, the value of any one of the resistances included in the bridge 3000 is changed, a non-zero output voltage Vo is output.

Here, as shown in FIG. 17c, when the strain gauge 450 is RG and the RG is changed, the resistance change of the strain gauge 450 causes imbalance of the bridge and generates the non-zero output voltage Vo. The normal resistance of the strain gauge 450 is RG, the resistance change, i.e., ΔR that is induced by the deformation may be represented by ΔR=RG×GF×ε through the gauge factor equation. Here, when it is assumed that R1=R2 and R3=RG, the bridge equation may be represented again by a function of the strain ε of VO/VEX as follows.

$$\frac{V_O}{V_{EX}} = -\frac{GF \cdot \varepsilon}{4}\left(\frac{1}{1 + GF \cdot \frac{\varepsilon}{2}}\right)$$

Though the bridge of FIG. 17c includes only one strain gauge 450, even four strain gauges can be used at positions indicated by R1, R2, R3, and R4 included in the bridge of FIG. 17b. In this case, it can be understood that the resistance changes of the gauges can be used to detect the applied force.

Figure 17D:
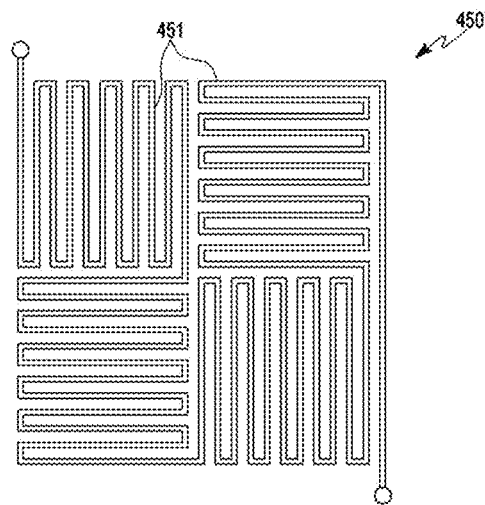

As shown in FIGS. 17c and 17d, when a force is applied to the display panel 200A on which the strain gauge 450 has been formed, the display panel 200A is bent. Due to the bending of the display panel 200A, the trace 451 is extended and becomes longer and narrower, so that the resistance of the strain gauge 450 increases. As the applied force increases, the resistance of the strain gauge 450 may increase in response to the increase of the force. Therefore, when the pressure sensor controller 1300 detects the increase of the resistance value of the strain gauge 450, the increase may be interpreted as the force applied to the display panel 200A.

In another embodiment, the bridge 3000 may be integrated with the pressure sensor controller 1300. In this case, at least one of the resistances R1, R2, and R3 may be replaced with the resistance within the pressure sensor controller 1300. For example, the resistances R1 and R2 may be replaced with the resistances within the pressure sensor controller 1300 and the bridge 3000 may be composed of the strain gauge 450 and the resistance R1. As a result, a space occupied by the bridge 3000 can be reduced.

In the strain gauge 450 shown in FIG. 17a, the traces 451 are arranged in a horizontal direction. Therefore, the sensitivity for the horizontal deformation is high because the length change of the trace 451 is large with respect to the horizontal deformation. However, the sensitivity for the vertical deformation is low because the length change of the trace 451 is relatively small with respect to the vertical deformation. As shown in FIG. 6d, the strain gauge 450 may include a plurality of sub-areas, and the arrangement direction of the traces 451 included in the respective sub-areas may be different. As such, the strain gauge 450 including the traces 451 of which the arrangement directions are different is provided, so that the sensitivity difference of the strain gauge 450 with respect to the deformation direction can be reduced.

Figure 17E:
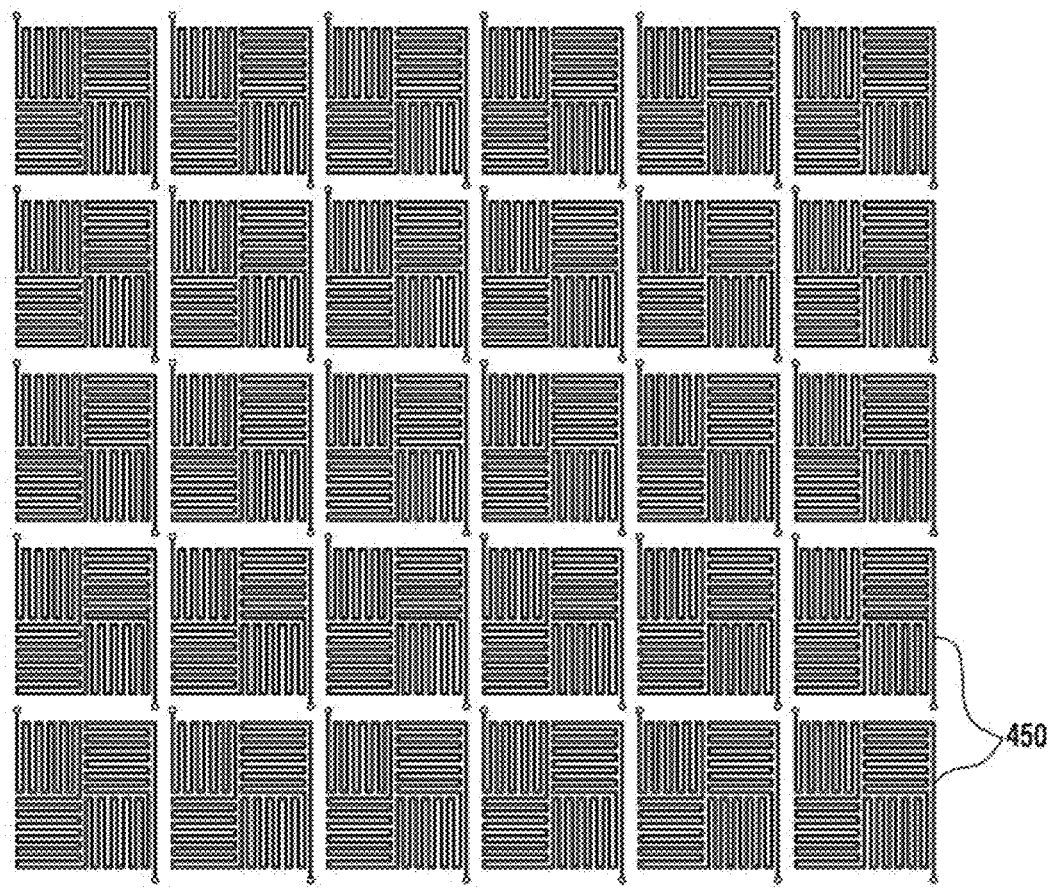

In the touch input device 1000 according to the embodiment of the present invention, one strain gauge 450 is, as shown in FIGS. 17a and 17d, formed under the display panel 200A, so that the force sensor composed of a single channel can be provided. Also, in the touch input device 1000 according to the embodiment of the present invention, a plurality of the strain gauges 450 are, as shown in FIG. 17e, formed under the display panel 200A, so that the force sensor composed of a plurality of the channels can be provided. By using such a force sensor composed of the plurality of the channels, the magnitude of each of the plurality of the forces on the plurality of the touches can be simultaneously sensed.

Temperature rise expands the display panel 200A even without the force applied, and thus, the strain gauge 450 formed on the display panel 200A may be extended. Therefore, the temperature change may have a bad influence on the strain gauge 450. As a result, the resistance of the strain gauge 450 may be increased, which may be incorrectly interpreted that a force is applied to the strain gauge 450.

For the purpose of compensating for the temperature change, at least one of the resistances R1, R2, and R3 of the bridge 3000 shown in FIG. 17c may be replaced with a thermistor. The resistance change due to the temperature of the thermistor may cope with the resistance change of the strain gauge 450 due to the temperature by the thermal expansion of the display panel 200A on which the strain gauge 450 has been formed. Consequently, the change of the output voltage Vo due to the temperature can be reduced.

Figure 17F:
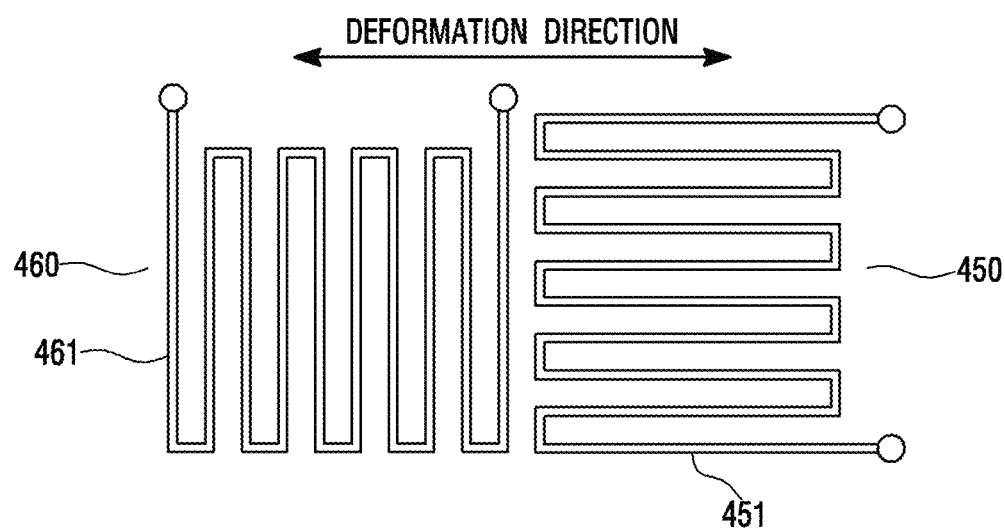

Also, the effect of the temperature change can be minimized by using two gauges. For example, as shown in FIG. 17f, the strain gauge 450 is deformed in the horizontal direction, the traces 451 of the strain gauge 450 may be arranged in the horizontal direction parallel to the deformation direction, and traces 461 of a dummy gauge 460 may be arranged in a vertical direction perpendicular to the deformation direction. Here, the deformation affects the strain gauge 450 and hardly affects the dummy gauge 460. However, the temperature has the same effect on both the strain gauge 450 and the dummy gauge 460. Therefore, the temperature change is applied equally to the two gauges, so that a ratio between the normal resistances RG of the two gauges does not change. Here, when the two gauges share an output node of the Wheatstone bridge, that is to say, when the two gauges are R1 and R2 or R3 and R4 of FIG. 6b, the output voltage Vo of the bridge 3000 does not change either, the effect of the temperature change can be minimized.

Figure 17G:
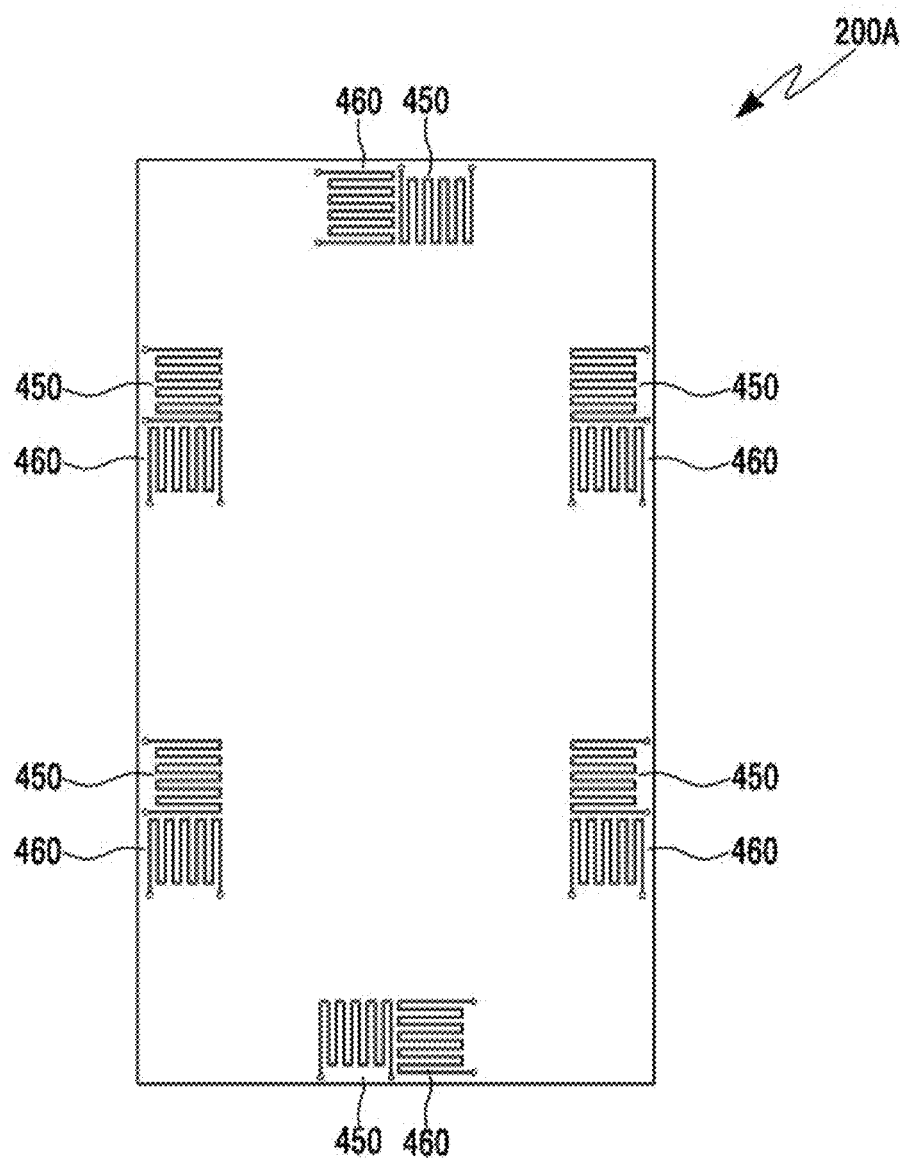
FIGS. 17g to 17i are rear views of the display panel in which the pressure sensor (or force sensor) of the touch input device according to the embodiment of the present invention has been formed.
Figure 17H:
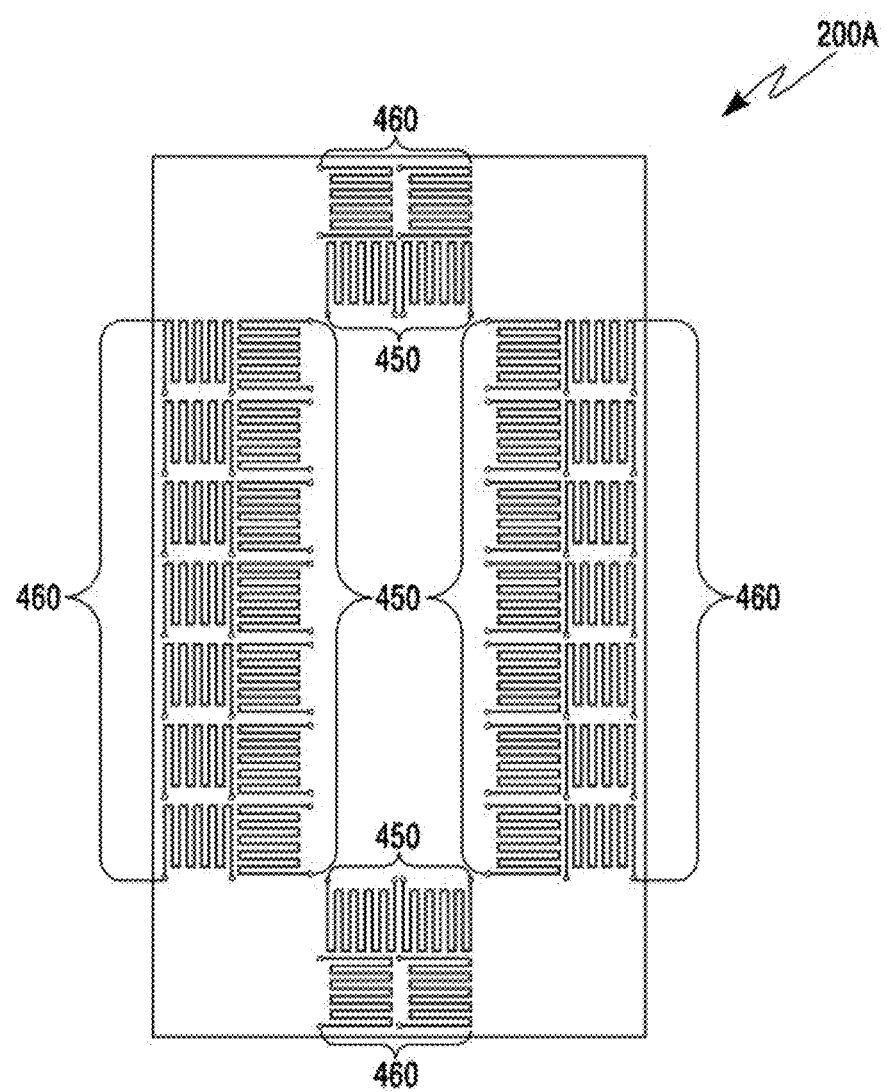
Figure 17I:
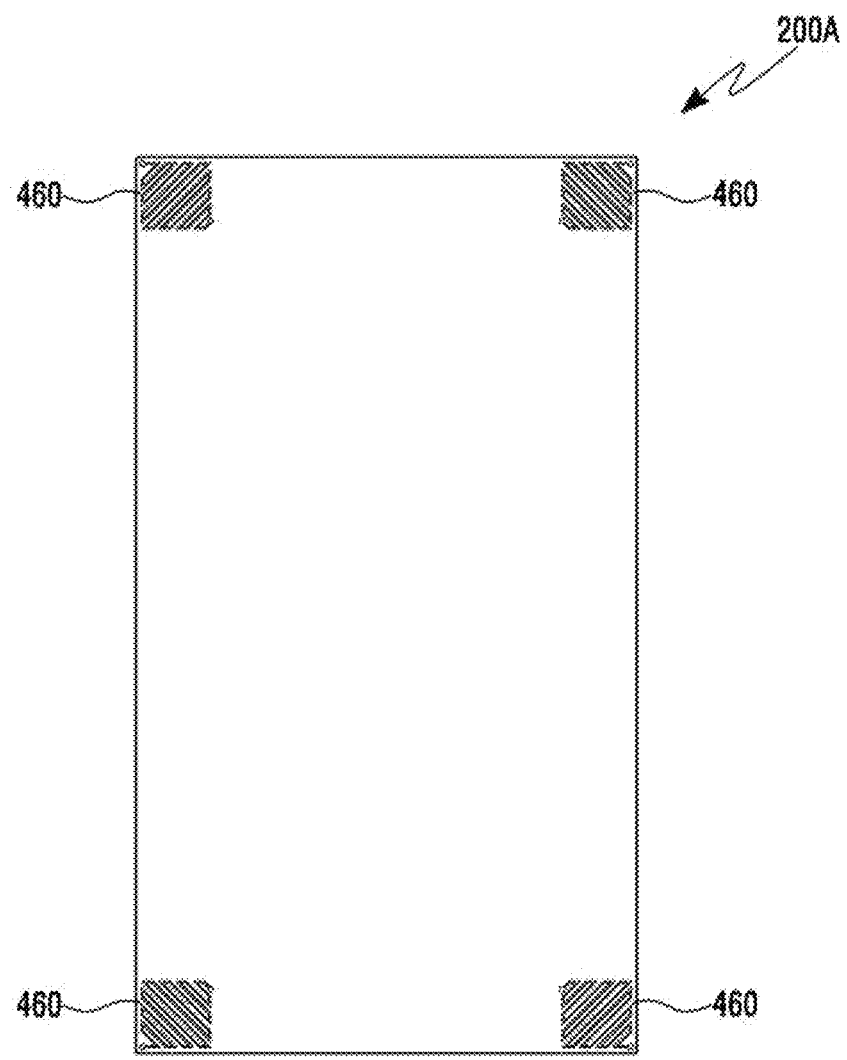

FIGS. 17g to 17i are rear views of the display panel in which the force sensor of the touch input device according to the embodiment of the present invention has been formed.

Since it is preferable that the trace 451 of the strain gauge 450 should be arranged in a direction parallel to the deformation direction, the trace 451 of the strain gauge 450 may be, as shown in FIG. 17g, arranged in the edge region of the display panel 200A in a direction perpendicular to the border of the display panel 200A. More specifically, since the border of the display panel 200A is fixed, when a force is applied to the display panel 200A, the biggest deformation may occur in a direction parallel to a straight line connecting the center of the display panel 200A with the position to which the force is applied. Therefore, it is preferable that the trace 451 of the strain gauge 450 should be arranged in a direction parallel to a straight line connecting the position where the strain gauge 450 is disposed with the center of the display panel 200A.

In the meantime, since it is preferable that the trace 461 of the dummy gauge 460 should be arranged in a direction perpendicular to the deformation direction, the trace 461 of the dummy gauge 460 may be, as shown in FIG. 17g, arranged in the edge region of the display panel 200A in a direction parallel to the border of the display panel 200A. More specifically, since the border of the display panel 200A is fixed, when a force is applied to the display panel 200A, the smallest deformation may occur in a direction perpendicular to a straight line connecting the center of the display panel 200A with the position to which the force is applied. Therefore, it is preferable that the trace 461 of the dummy gauge 460 should be arranged in a direction perpendicular to a straight line connecting the position where the dummy gauge 460 is disposed with the center of the display panel 200A.

Here, as shown in FIG. 17g, the strain gauge 450 and the dummy gauge 460 consisting of a pair with each other may be disposed adjacent to each other. In this case, the effect of the temperature change can be more minimized because the temperature difference between the adjacent positions may not be large.

Also, for example, as shown in FIG. 17h, a plurality of the dummy gauges 460 having the traces 461 arranged in a direction parallel to the border of the display panel 200A may be disposed along the border of the display panel 200A. In this case, since the edge region of the display panel 200A has a very small deformation amount caused by the force, the dummy gauge 460 disposed in the edge region of the display panel 200A may be more effective for compensating for the effect of the temperature change. Also, for example, as shown in FIG. 17i, the dummy gauge 460 may be disposed in four corner regions of the display panel 200A, which has the smallest deformation amount. The trace of the dummy gauge 460 may be arranged in a direction perpendicular to a direction in which the deformation amount is the largest.

Figure 18:
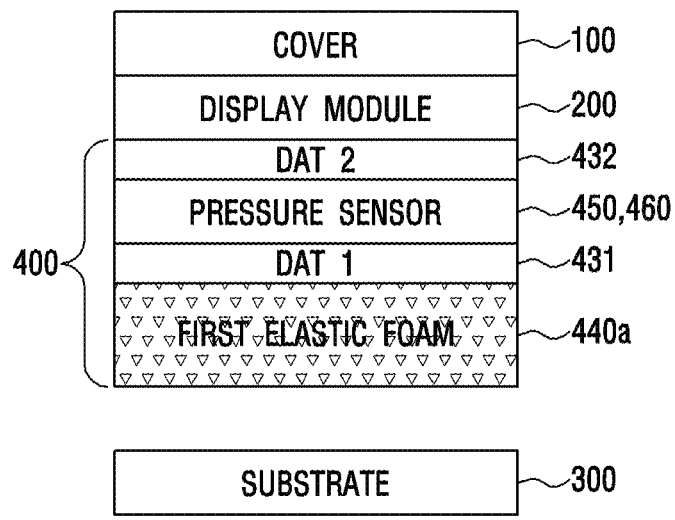
FIG. 18 is a cross sectional view of an example in which the touch input device shown in FIG. 6b is embodied.

FIG. 18 is a cross sectional view of an example in which the touch input device shown in FIG. 6b is embodied.

Referring to FIG. 18, the touch input device according to the embodiment of the present invention includes a cover 100, the display module 200, the substrate 300, and the pressure sensing unit 400. The pressure sensing unit 400 is disposed on the display module 200. Specifically, the pressure sensing unit 400 may be disposed on the bottom surface of the display module 200. The pressure sensing unit 400 may be spaced from the substrate 300. However, there is no limitation to this. The pressure sensing unit 400 may come in contact with the top surface of the substrate 300.

The pressure sensing unit 400 shown in FIG. 18 includes a first elastic foam 440a, the pressure sensors 450 and 460 disposed on the first elastic foam 440a, the first adhesive layer 431 disposed between the first elastic foam 440a and the pressure sensors 450 and 460, and the second adhesive layer 432 disposed between the pressure sensors 450 and 460 and the display module 200.

The first elastic foam 440a is located at the lowest position among various components constituting the pressure sensing unit 400 and is disposed above the substrate 300. FIG. 18 shows that the first elastic foam 440a is spaced from the top surface of the substrate 300. However, there is no limitation to this. Unlike FIG. 18, the first elastic foam 440a may come in contact with the top surface of the substrate 300.

The first elastic foam 440a is affected by the pressure of the object input to the surface of the cover 100, and then the physical state of the first elastic foam 440a is changed. When the pressure of the object input to the surface of the cover 100 is removed, the first elastic foam 440a returns to its original state.

The first elastic foam 440a includes at least one of polyurethane, polyester, polypropylene and acryl.

The thickness of the first elastic foam 440a may be from 174 μm to 226 μm and preferably 200 μm. The color of the first elastic foam 440a may be gray. The density of the first elastic foam 440a may be from 0.27 g/cm3 to 0.33 g/cm3. The compression set of the first elastic foam 440a may be less than 10%. The first elastic foam 440a may have 25% compression force deflection from 0.05 kg/cm2 to 0.20 kg/cm2.

In the touch input device shown in FIG. 18, due to the characteristics of the location of the first elastic foam 440a, it is important that the first elastic foam 440a should absorb most of an external force directly transferred thereto until the first elastic foam 440a is compressed to a predetermined thickness from its original state and should protect the display module 200 or the substrate 300 by resisting the external force transferred to the first elastic foam 440a when the first elastic foam 440a has a thickness smaller than the predetermined thickness. Here, the predetermined thickness may be half the thickness of the original state.

The change amount of a stress of the first elastic foam 440a required for the first elastic foam 440a to be compressed to a predetermined thickness from its original state is less than the change amount of a stress of the first elastic foam 440a required for the first elastic foam 440a to be compressed to a thickness smaller than the predetermined thickness. The first elastic foam 440a is pressed well up to a predetermined thickness by an external force and resists the external force when the first elastic foam 440a has a thickness smaller than the predetermined thickness. Therefore, the first elastic foam 440a is able to protect the display module 200 or the substrate 300.

A stress of the first elastic foam 440a required for the first elastic foam 440a to be compressed from its original state to half of the thickness thereof is less than 0.1 Mpa. Since the stress corresponding to the external force which is transferred from itself is very low, there is an advantage that the cover 100, the display module 200, and the pressure sensing unit 400 are pressed well by the pressure of the object input to the cover 100. Accordingly, the distance between the substrate 300 and the pressure sensors 450 and 460 of the pressure sensing unit 400 is immediately changed by the pressure of the object, so that the pressure detection sensitivity can be improved.

The first elastic foam 440a shown in FIG. 18 has a predetermined characteristic between the compression ratio and the stress.

A compression ratio-stress characteristic of the first elastic foam 440a shown in FIG. 18 will be described in detail with reference to FIGS. 19a to 19b.

Figure 19A:
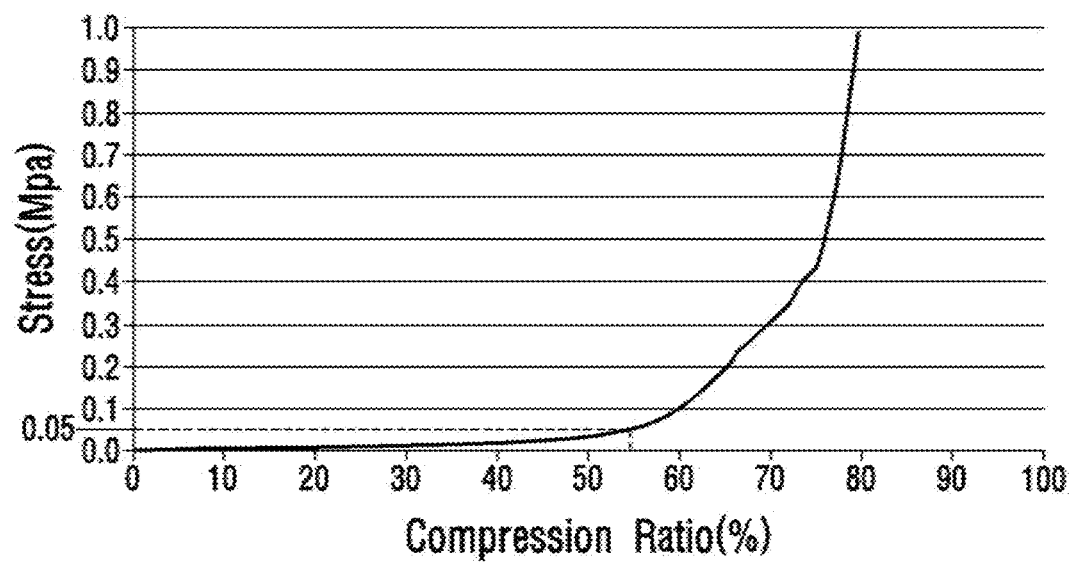
FIG. 19a is a compression ratio-stress curve showing a compression ratio-stress characteristic of a first elastic foam 440a shown in FIG. 18.

FIG. 19a is a compression ratio-stress curve showing a compression ratio-stress characteristic of the first elastic foam 440a shown in FIG. 18. Here, the stress means a resistance force "Mpa" which is formed at the first elastic foam 440a in response to an external force applied to the first elastic foam 440a. The compression ratio is a percentage (%)-expressed value meaning a degree to which the first elastic foam 440a is compressed.

Figure 19B:
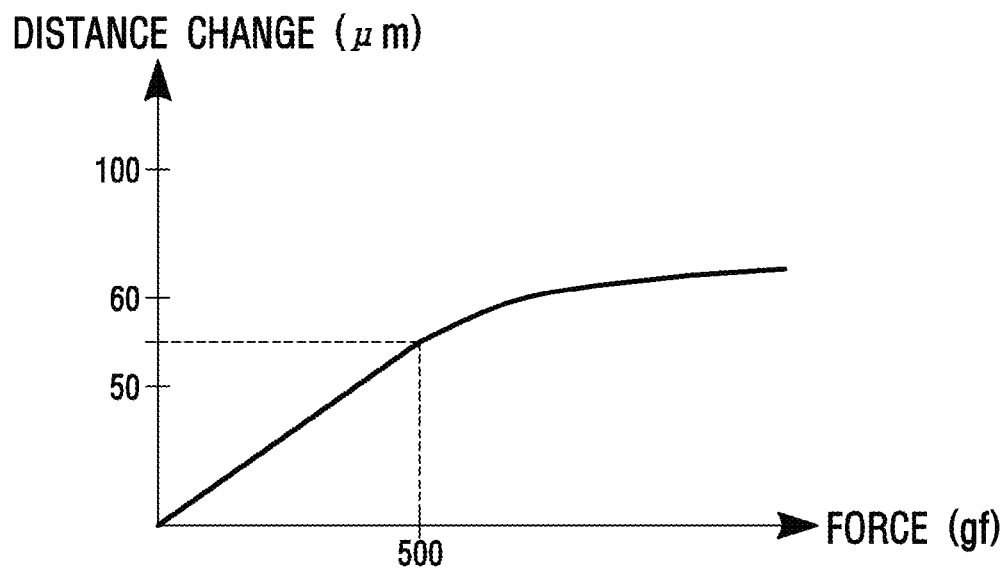
FIG. 19b is a graph showing a distance change due to a force (go which is applied to the first elastic foam 440a shown in FIG. 18.

FIG. 19b is a graph showing a distance change due to a force (gf) which is applied to the first elastic foam 440a shown in FIG. 18. Here, the distance change means a distance change between the substrate 300 and the pressure sensors 450 and 460 when it is assumed that the maximum distance between the substrate 300 and the pressure sensors 450 and 460 is 100 μm.

Referring to FIG. 19a, the change amount of the stress of the first elastic foam 440a required for the first elastic foam 440a to be compressed to half of the thickness thereof from its original state is less than the change amount of the stress of the first elastic foam 440a required for the first elastic foam 440a to be compressed from half of the thickness thereof to the thickness to which the first elastic foam 440a can be maximally compressed.

Also, the change amount of the compression ratio of the first elastic foam 440a when the stress of the first elastic foam 440a is greater than 0 and equal to or less than 0.05 Mpa is greater than the change amount of the compression ratio of the first elastic foam 440a when the stress of the first elastic foam 440a is greater than 0.05 Mpa and equal to or less than 1.0 Mpa.

Since the first elastic foam 440a is pressed well up to half of the thickness thereof by the external force, the distance between the substrate 300 and the pressure sensors 450 and 460 of the pressure sensing unit 400 is immediately changed by the pressure of the object, so that the pressure detection sensitivity can be improved. Also, the first elastic foam 440a resists the external force when the first elastic foam 440a has a thickness smaller than half of the thickness thereof. Therefore, the first elastic foam 440a is able to protect the display module 200 or the substrate 300.

The stress according to the compression ratio of the first elastic foam 440a has a property of exponentially increasing. On the contrary, the compression ratio according to the stress has a property of exponentially decreasing.

The stress of the first elastic foam 440a required for the first elastic foam 440a to be compressed from its original state to half of the thickness thereof is less than 0.05 Mpa.

While the stress of the first elastic foam 440a increases from 0 to 0.05 Mpa, the compression ratio of the first elastic foam 440a exceeds 50%.

An average change amount of the compression ratio of the first elastic foam 440a when the stress of the first elastic foam 440a is greater than 0 and equal to or less than 0.05 Mpa is greater than that of the compression ratio of the first elastic foam 440a when the stress of the first elastic foam 440a is greater than 0.05 Mpa and equal to or less than 1.0 Mpa.

Referring to FIG. 19b, when the intensity of the force which is applied to the first elastic foam 440a increases from 0 to 500 (gf), the distance change also increases linearly. However, when the intensity of the applied force further increases and exceeds 500 (gf), the distance change rate gradually decreases.

Referring back to FIG. 19a, there is a characteristic that the change amount of the stress according to the compression ratio in a compression ratio interval of 0% to 50% of the first elastic foam 440a is equal to or less than half of the change amount of the stress according to the compression ratio in the compression ratio interval of 50% to 60% of the first elastic foam 440a.

There is a characteristic that the stress according to the compression ratio increases linearly in the compression ratio interval of less than 50% of the first elastic foam 440a and increases exponentially in the compression ratio interval of equal to or greater than 50%.

The first elastic foam 440a has the compression ratio of equal to or greater 70% in a state where the stress is equal to or greater than 0.3 Mpa.

As such, referring to the graphs shown in FIGS. 19a to 19b, since the first elastic foam 440a shown in FIG. 18 is easily deformed at a low pressure applied thereto, the first elastic foam 440a has an advantage of being sensitive to the pressure of the object input to the cover 100 shown in FIG. 18.

Figure 20:
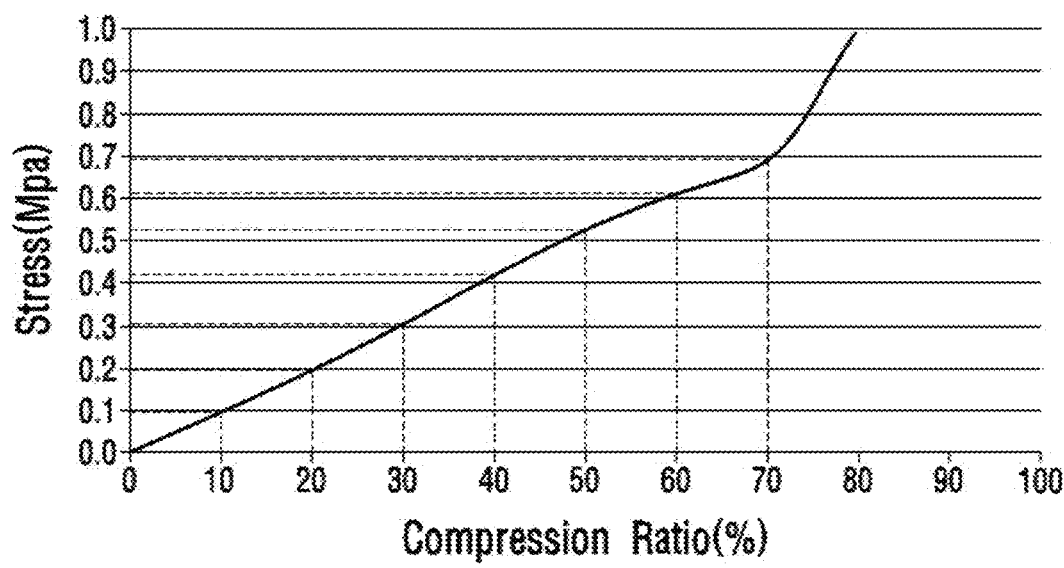
FIG. 20 is a compression ratio-stress curve showing another characteristic of the first elastic foam 440a of a pressure sensing unit 400 shown in FIG. 18.

Meanwhile, FIG. 20 is a compression ratio-stress curve showing another characteristic of the first elastic foam 440a of the pressure sensing unit 400 shown in FIG. 18. The first elastic foam 440a shown in FIG. 18 may have the compression ratio-stress characteristic of FIG. 19a or the compression ratio-stress characteristic of FIG. 20.

Referring to FIG. 20, an error between the slope of the stress of the first elastic foam 440a in the compression ratio interval of 0% to 50% of the first elastic foam 440a and the slope of the stress of the first elastic foam 440a in the compression ratio interval of 50% to 70% of the first elastic foam 440a may be within 5%. This means that the stress according to the compression ratio of the first elastic foam 440a shown in FIG. 20 is linear. Since the slope of the stress according to the compression ratio of the first elastic foam 440a is linear, the first elastic foam 440a shown in FIG. 20 has a better restoring force to the original state than that of the first elastic foam 440a shown in FIG. 19a. Also, since the first elastic foam 440a shown in FIG. 20 has a compression ratio which is nearly constant according to the applied external force, the user may feel much less discomfort.

The slope of the stress of the first elastic foam 440a shown in FIG. 20 in the compression ratio interval of equal to or greater than 70% of the first elastic foam 440a is equal to or greater than twice as much as the slope of the stress of the first elastic foam 440a in the compression ratio interval of 50% to 70% of the first elastic foam 440a. This means that the first elastic foam 440a is difficult to compress when the compression ratio exceeds 70%.

Meanwhile, the slope of the stress curve according to the compression ratio of less than 60% of the first elastic foam 440a shown in FIG. 19a is smaller than the slope of the stress curve according to the compression ratio of the first elastic foam 440a shown in FIG. 20. This means that the first elastic foam 440a shown in FIG. 19a is more compressed than the first elastic foam 440a shown in FIG. 20 even by a smaller pressure change. Therefore, the sensitivity of the touch input device using the first elastic foam 440a shown in FIG. 19a is higher than the sensitivity of the touch input device using the first elastic foam 440a shown in FIG. 20.

Also, referring to FIG. 20, the stress of the first elastic foam 440a in the compression ratio interval of 0% to 70% of the first elastic foam 440a may be linear with respect to the compression ratio of the first elastic foam 440a.

Specifically, a coefficient of determination between the compression ratio of the first elastic foam 440a and the stress of the first elastic foam 440a in the compression ratio interval of 0% to 70% of the first elastic foam 440a may be equal to or greater than 0.9.

Here, the coefficient of determination between the stress of the first elastic foam 440a and the compression ratio of the first elastic foam 440a may be the square of a coefficient of correlation "R" between the stress of the first elastic foam 440a and the compression ratio of the first elastic foam 440a.

Here, the coefficient of correlation "R" between the stress of the first elastic foam 440a and the compression ratio of the first elastic foam 440a may be calculated by the following equation (1).

$$r = \frac{\sum_{i=1}^{n}(x_i - \bar{x})(y_i - \bar{y})}{\sqrt{\sum_{i=1}^{n}(x_i - \bar{x})^2} \cdot \sqrt{\sum_{i=1}^{n}(y_i - \bar{y})^2}}$$

The coefficient of correlation "R" between the compression ratio of the first elastic foam 440a and the stress of the first elastic foam 440a in the compression ratio interval of 0% to 70% of the first elastic foam 440a shown in FIG. 20 may be calculated by the equation (1) as shown in the following table 1 below.

TABLE 1

| xi | Yi |
|---|---|
| 10 | 0.087 |
| 20 | 0.191 |
| 30 | 0.301 |
| 40 | 0.425 |
| 50 | 0.532 |
| 60 | 0.613 |
| 70 | 0.694 |

In the above table 1, "xi" represents the compression ratio of the first elastic foam 440a shown in FIG. 20. "yi" represents a stress value of the first elastic foam 440a, which corresponds to the compression ratio of the first elastic foam 440a shown in FIG. 20.

The "xi" and "yi" of the table 1 are substituted into the equation (1), so that the coefficient of correlation "R" is approximately 0.997486. Therefore, the coefficient of determination between the compression ratio of the first elastic foam 440a and the stress of the first elastic foam 440a in the compression ratio interval of 0% to 70% of the first elastic foam 440a is approximately 0.994978, which corresponds to the square of the coefficient of correlation "R".

Referring back to FIG. 18, the pressure sensors 450 and 460 are disposed on the first elastic foam 440a. Specifically, the pressure sensors 450 and 460 are disposed on the top surface of the first elastic foam 440a. As shown in FIG. 18, when the first adhesive layer 431 is disposed on the top surface of the first elastic foam 440a, the pressure sensors 450 and 460 are disposed on the first adhesive layer 431.

The pressure sensors 450 and 460 may be any one of the above-described pressure sensors shown in FIGS. 4a to 5e and FIGS. 7a to 12c. The magnitude of the pressure of the object input to the cover 100 can be detected by using the pressure sensors 450 and 460. Since the method for detecting the magnitude of the pressure has been described above with reference to FIGS. 1 to 13, the detailed description thereof will be omitted.

The first adhesive layer 431 contacts both the top surface of the first elastic foam 440a and the bottom surface of the pressure sensors 450 and 460, thereby causing the first elastic foam 440a and the pressure sensors 450 and 460 to be fixed so as not to be separated from each other. Here, the thickness of the first adhesive layer 431 may be approximately 30 μm.

The second adhesive layer 432 contacts both the top surface of the pressure sensors 450 and 460 and the bottom surface of the display module 200, thereby causing the pressure sensors 450 and 460 and the display module 200 to be fixed so as not to be separated from each other. Here, the thickness of the second adhesive layer 432 may be approximately 30 μm.

Figure 21:
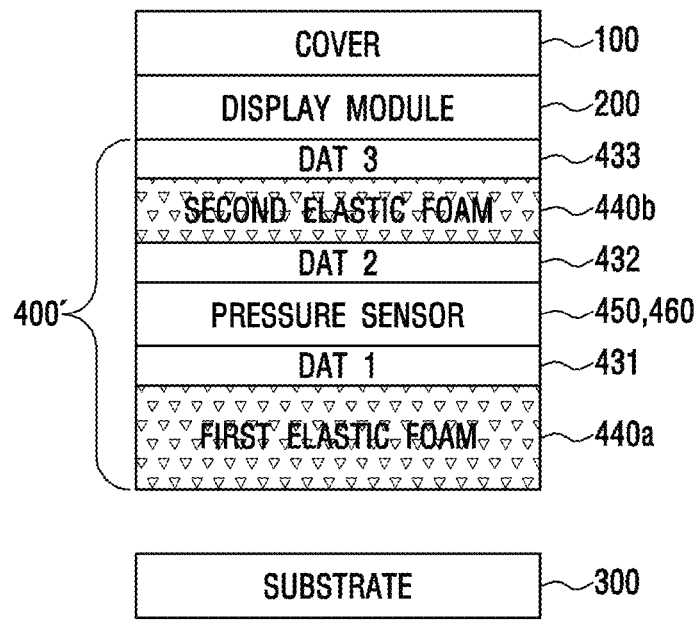
FIG. 21 is a cross sectional view of another example in which the touch input device shown in FIG. 6b is embodied.

FIG. 21 is a cross sectional view of another example in which the touch input device shown in FIG. 6b is embodied.

Referring to FIG. 21, the touch input device according to the embodiment of the present invention includes the cover 100, the display module 200, the substrate 300, and a pressure sensing unit 400'. Since the cover 100, the display module 200, and the substrate 300 are the same as those shown in FIG. 18, the detailed description thereof will be omitted.

The pressure sensing unit 400' includes the first elastic foam 440a, the pressure sensors 450 and 460 disposed on the first elastic foam 440a, a second elastic foam 440b disposed on the pressure sensors 450 and 460, the first adhesive layer 431 disposed between the first elastic foam 440a and the pressure sensors 450 and 460, the second adhesive layer 432 disposed between the pressure sensors 450 and 460 and the second elastic foam 440b, the third adhesive layer 433 disposed between the second elastic foam 440b and the display module 200.

The first elastic foam 440a is the same as the first elastic foam 440a shown in FIGS. 18 to 20. Also, the first adhesive layer 431 and the pressure sensors 450 and 460 are the same as the first adhesive layer 431 and the pressure sensors 450 and 460 shown in FIG. 18.

The second adhesive layer 432 contacts both the top surface of the pressure sensors 450 and 460 and the bottom surface of the second elastic foam 440b, thereby causing the pressure sensors 450 and 460 and the second elastic foam 440b to be fixed so as not to be separated from each other. Here, the thickness of the second adhesive layer 432 may be approximately 30 μm.

The third adhesive layer 433 contacts both the top surface of the second elastic foam 440b and the bottom surface of the display module 200, thereby causing the second elastic foam 440b and the display module 200 to be fixed so as not to be separated from each other. Here, the thickness of the third adhesive layer 433 may be approximately 30 μm.

The second elastic foam 440b includes at least one of polyurethane, polyester, polypropylene and acryl.

The second elastic foam 440b is disposed between the second adhesive layer 432 and the third adhesive layer 433.

The second elastic foam 440b has a thickness less than that of the first elastic foam 440a. For example, the thickness of the second elastic foam 440b may be equal to or less than half of the thickness of the first elastic foam 440a.

Specifically, the thickness of the second elastic foam 440b may be from 80 μm to 120 μm and preferably may be 100 μm. The color of the second elastic foam 440b may be gray. The density of the second elastic foam 440b may be from 0.415 to 0.495 g/cm3. The compression set of the second elastic foam 440b may be less than 25%. The second elastic foam 440b may have 25% compression force deflection from 0.15 kg/cm2 to 0.35 kg/cm2.

The stress characteristic according to the compression ratio of the second elastic foam 440b is different from the stress characteristic according to the compression ratio of the first elastic foam 440a shown in FIG. 19a or 20. This will be specifically described with reference to FIG. 22.

Figure 22:
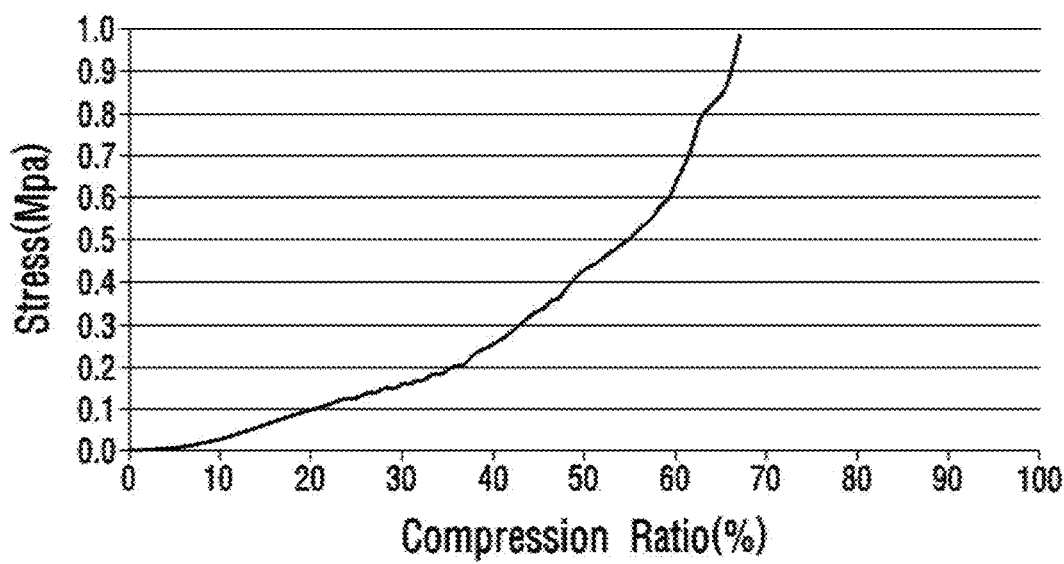
FIG. 22 is a graph showing a stress characteristic according to a compression ratio of a second elastic foam 440b shown in FIG. 21.

FIG. 22 is a graph showing the stress characteristic according to the compression ratio of the second elastic foam 440b shown in FIG. 21.

Referring to FIG. 22, the stress curve according to the compression ratio of the second elastic foam 440b increases exponentially. On the contrary, a compression ratio curve according to the stress decreases exponentially.

The change amount of the stress of the second elastic foam 440b required for the second elastic foam 440b to be compressed from its original state to half of the thickness thereof is greater than the change amount of the stress of the first elastic foam 440a shown in FIG. 19a. Specifically, the change amount of the stress according to the compression ratio in the compression ratio interval of 0% to 50% of the second elastic foam 440b is equal to or greater than ten times as much as the change amount of the stress according to the compression ratio in the compression ratio interval of 0% to 50% of the first elastic foam 440a shown in FIG. 19a.

The change amount of the compression ratio of the second elastic foam 440b when the stress of the second elastic foam 440b is greater than 0 and equal to or less than 0.05 Mpa is less than the change amount of the compression ratio of the first elastic foam 440a when the stress of the first elastic foam 440a shown in FIG. 19a is greater than 0 Mpa and equal to or less than 0.05 Mpa.

The stress according to the compression ratio in the compression ratio interval of 0% to 50% of the second elastic foam 440b increases exponentially while the stress according to the compression ratio in the compression ratio interval of 0% to 50% of the first elastic foam 440a shown in FIG. 20 increases linearly.

The dielectric constant of the second elastic foam 440b may be less than the dielectric constant of the first elastic foam 440a. That is, the dielectric constant of the first elastic foam 440a may be greater than the dielectric constant of the second elastic foam 440b. When the dielectric constant of the second elastic foam 440b is less than the dielectric constant of the first elastic foam 440a, the first elastic foam 440a is more responsive to the external force than the second elastic foam 440b and quickly returns to its original state.

Also, when the dielectric constant of the second elastic foam 440b is less than the dielectric constant of the first elastic foam 440a, the parasitic capacitance of the capacitance type touch input device can be reduced. While the first elastic foam 440a is a cushion which is mainly used to detect the pressure by the capacitance change amount in the capacitance type touch input device, the second elastic foam 440b compared to the first elastic foam 440a is not the cushion which is mainly used to detect the pressure by the capacitance change amount in the capacitance type touch input device. However, the capacitance change amount generated in the touch input device when the pressure is detected includes the parasitic capacitance due to the second elastic foam 440b. For the sake of minimizing the parasitic capacitance, it is recommended that the generation of the parasitic capacitance should be reduced by reducing the dielectric constant of the second elastic foam 440b. Therefore, when the dielectric constant of the second elastic foam 440b is made less than the dielectric constant of the first elastic foam 440a, the parasitic capacitance can be more significantly reduced than when the dielectric constant of the second elastic foam 440b is equal to or greater than the dielectric constant of the first elastic foam 440a.

Figure 23:
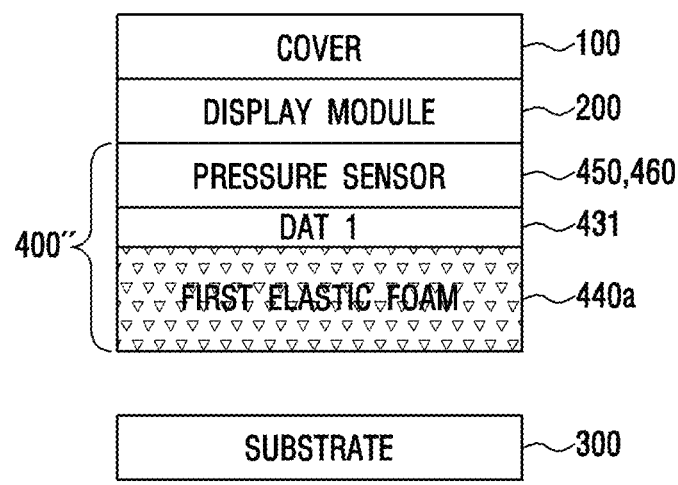
FIG. 23 is a cross sectional view of further another example in which the touch input device shown in FIG. 6b is embodied.

FIG. 23 is a cross sectional view of further another example in which the touch input device shown in FIG. 6b is embodied.

A pressure sensing unit 400″ of the touch input device shown in FIG. 23 is different from the pressure sensing unit 400 of the touch input device shown in FIG. 18. Specifically, the pressure sensing unit 400″ shown in FIG. 23 does not include the second adhesive layer 432 of the pressure sensing unit 400 shown in FIG. 18.

Unlike the pressure sensors 450 and 460 shown in FIG. 18, the pressure sensors 450 and 460 of the pressure sensing unit 400″ shown in FIG. 23 are directly formed on the display module 200. Specifically, the pressure sensors 450 and 460 may be directly formed on the bottom surface of the display module 200 by using any one of the following various methods.

The method for directly forming the pressure sensors 450 and 460 on the bottom surface of the display module 200 includes a photolithography method using a mask, a gravure printing method, an inkjet printing method, a screen printing method, a flexography method, and a transfer printing method, etc.

In the above-described touch input device shown in FIGS. 18 to 23, the pressure sensors 450 and 460 may be the pressure sensor 450 described in FIGS. 15a to 17i.

Figure 24:
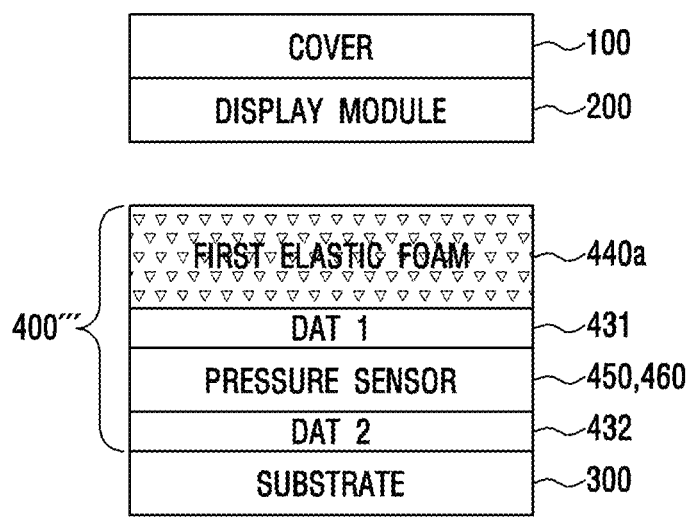
FIG. 24 is a cross sectional view of an example in which the touch input device shown in FIG. 6a is embodied.

FIG. 24 is a cross sectional view of an example in which the touch input device shown in FIG. 6a is embodied.

Referring to FIG. 24, the touch input device according to the embodiment of the present invention includes the cover 100, the display module 200, the substrate 300, and a pressure sensing unit 400‴. The pressure sensing unit 400‴ is disposed on the substrate 300. Specifically, the pressure sensing unit 400‴ may be disposed on the bottom surface of the substrate 300. The pressure sensing unit 400‴ may be spaced apart from the display module 200. However, there is no limitation to this. The pressure sensing unit 400‴ may contact with the bottom surface of the display module 200.

The structure of the pressure sensing unit 400‴ shown in FIG. 24 is obtained by turning upside down the pressure sensing unit 400 shown in FIG. 18 and by bonding the second adhesive layer 432 to the top surface of the substrate 300. The respective components 440a, 431, 450, 460, and 432 of the pressure sensing unit 400‴ are the same as those shown in FIG. 18. Therefore, the descriptions of the respective components will be replaced with the foregoing description.

Figure 25:
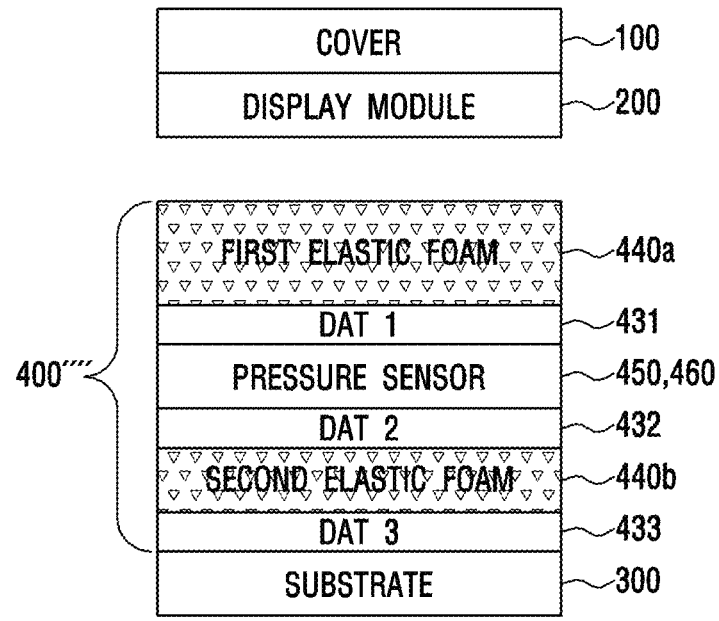
FIG. 25 is a cross sectional view of another example in which the touch input device shown in FIG. 6a is embodied.

FIG. 25 is a cross sectional view of another example in which the touch input device shown in FIG. 6a is embodied.

The structure of a pressure sensing unit 400″″ shown in FIG. 25 is obtained by turning upside down the pressure sensing unit 400′ shown in FIG. 21 and by bonding the third adhesive layer 433 to the top surface of the substrate 300. The respective components 440a, 431, 450, 460, 432, 440b, and 433 of the pressure sensing unit 400″″ are the same as those shown in FIG. 21. Therefore, the descriptions of the respective components will be replaced with the foregoing description.

Figure 26:
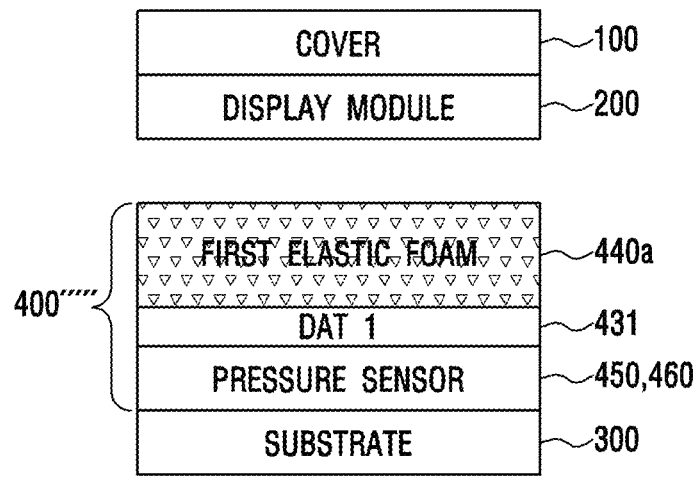
FIG. 26 is a cross sectional view of further another example in which the touch input device shown in FIG. 6a is embodied.

FIG. 26 is a cross sectional view of further another example in which the touch input device shown in FIG. 6a is embodied.

The structure of a pressure sensing unit 400″″′ shown in FIG. 26 is obtained by turning upside down the pressure sensing unit 400″ shown in FIG. 23 and by bonding the pressure sensors 450 and 460 to the top surface of the substrate 300. The respective components 440a, 431, 450, and 460 of the pressure sensing unit 400″″′ are the same as those shown in FIG. 22. Therefore, the descriptions of the respective components will be replaced with the foregoing description.

Although embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A touch input device comprising:
a cover;
a display module disposed under the cover; and
a pressure sensing unit disposed under the display module,
wherein the pressure sensing unit comprises a first elastic foam, a pressure sensor disposed on the first elastic foam, and a first adhesive layer disposed between the first elastic foam and the pressure sensor,
wherein a change amount of a stress of the first elastic foam required for the first elastic foam to be compressed to half of the thickness thereof from its original state is less than the change amount of the stress of the first elastic foam required for the first elastic foam to be compressed from half of the thickness thereof to the thickness to which the first elastic foam is able to be maximally compressed,
wherein the pressure sensing unit comprises a second elastic foam disposed on the pressure sensor, a second adhesive layer disposed between the second elastic foam and the pressure sensor, and a third adhesive layer disposed between the second elastic foam and the display module, and
wherein the third adhesive layer is bonded to the display module.

2. The touch input device of claim 1, wherein the second elastic foam has a thickness less than that of the first elastic foam.

3. The touch input device of claim 1, wherein a dielectric constant of the second elastic foam is less than that of the first elastic foam.

4. The touch input device of claim 1, wherein a change amount of a stress of the second elastic foam required for the second elastic foam to be compressed to half of the thickness thereof from its original state is greater than the change amount of the stress of the first elastic foam required for the first elastic foam to be compressed to half of the thickness thereof from its original state.

5. The touch input device of claim 1, wherein a change amount of a compression ratio of the second elastic foam when a stress of the second elastic foam is greater than 0 and equal to or less than 0.05 Mpa is less than the change amount of the compression ratio of the first elastic foam when the stress of the first elastic foam is greater than 0 Mpa and equal to or less than 0.05 Mpa.

6. A touch input device comprising:
a cover;
a display module disposed under the cover; and
a pressure sensing trait disposed under the display module, wherein the pressure sensing unit comprises a first elastic foam, a pressure sensor disposed on the first elastic foam, and a first adhesive layer disposed between the first elastic foam and the pressure sensor, and wherein a change amount of a compression ratio of the first elastic foam when a stress of the first elastic foam is greater than 0 and equal to or less than 0.05 Mpa is greater than the change amount of the compression ratio of the first elastic foam when the stress of the first elastic foam is greater than 0.05 Mpa and equal to or less than 1.0 Mpa, wherein the pressure sensing unit comprises a second elastic foam disposed on the pressure sensor, a second adhesive layer disposed between the second elastic foam and the pressure sensor, and a third adhesive layer disposed between the second elastic foam and the display module, and wherein the third adhesive layer is bonded to the display module.

7. A touch input device comprising:

a cover;

a display module disposed under the cover; and a pressure sensing unit disposed under the display module, wherein the pressure sensing unit comprises a first elastic foam, a pressure sensor disposed on the first elastic foam, and a first adhesive layer disposed between the first elastic foam and the pressure sensor, and wherein a stress of the first elastic foam in a compression ratio interval of 0% to 70% of the first elastic foam is linear with respect to the compression ratio of the first elastic foam, wherein the pressure sensing unit comprises a second elastic foam disposed on the pressure sensor, a second adhesive layer disposed between the second elastic foam and the pressure sensor, and a third adhesive layer disposed between the second elastic foam and the display module, and wherein the third adhesive layer is bonded to the display module.

8. The touch input device of claim 7, wherein a coefficient of determination between the compression ratio of the first elastic foam and the stress of the first elastic foam in the compression ratio interval of 0% to 70% of the first elastic foam is equal to or greater than 0.9.

9. The touch input device of claim 7,
wherein the second adhesive layer is disposed on the pressure sensor.

10. The touch input device of claim 7, wherein the pressure sensor of the pressure sensing unit is directly formed on a bottom surface of the display module.

11. The touch input device of claim 7, further comprising a substrate disposed under the pressure sensing unit, wherein the pressure sensing unit is disposed on the substrate.

12. The touch input device of claim 11, wherein the second adhesive layer is disposed under the pressure sensor.

13. The touch input device of claim 11,
wherein the second elastic foam is disposed under the pressure sensor and the third adhesive layer is disposed between the second elastic foam and the substrate, and
wherein the third adhesive layer is bonded to the substrate.

14. The touch input device of claim 13, wherein the second elastic foam has a thickness less than that of the first elastic foam.

15. The touch input device of claim 13, wherein a dielectric constant of the second elastic foam is less than that of the first elastic foam.

16. The touch input device of claim 13, wherein a change amount of a stress of the second elastic foam required for the second elastic foam to be compressed to half of the thickness thereof from its original state is greater than the change amount of the stress of the first elastic foam required for the first elastic foam to be compressed to half of the thickness thereof from its original state.

17. The touch input device of claim 13, wherein a change amount of a compression ratio of the second elastic foam when a stress of the second elastic foam is greater than 0 and equal to or less than 0.05 Mpa is less than the change amount of the compression ratio of the first elastic foam when the stress of the first elastic foam is greater than 0 Mpa and equal to or less than 0.05 Mpa.

18. The touch input device of claim 11, wherein the pressure sensor of the pressure sensing unit is directly formed on a top surface of the substrate.

* * * * *